(12) United States Patent
Chang et al.

(10) Patent No.: US 7,103,090 B2
(45) Date of Patent: Sep. 5, 2006

(54) TIMING ESTIMATION OF DIRECT SEQUENCE SPREAD SPECTRUM COMMUNICATIONS SYSTEMS OVER FREQUENCY-SELECTIVE, SLOWLY FADING CHANNELS

(75) Inventors: Chao-Ming Chang, Hsinchu (TW); Chen-Yu Lo, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 769 days.

(21) Appl. No.: 10/094,221

(22) Filed: Mar. 8, 2002

(65) Prior Publication Data

US 2003/0072354 A1 Apr. 17, 2003

(51) Int. Cl.
H04B 1/707 (2006.01)
(52) U.S. Cl. .................. 375/145; 375/262; 375/341
(58) Field of Classification Search ................ 375/141, 375/144, 147–148, 260, 262, 265, 285, 340–341, 375/343, 346–350, 152, 145; 455/63.1, 65, 455/132–137, 296, 272, 273; 370/350
See application file for complete search history.

(56) References Cited

U.S. PATENT DOCUMENTS

| 5,621,769 | A | * | 4/1997 | Wan et al. | 375/347 |
|---|---|---|---|---|---|
| 5,623,511 | A | * | 4/1997 | Bar-David et al. | 375/143 |
| 5,701,333 | A | * | 12/1997 | Okanoue et al. | 375/347 |
| 6,130,909 | A | * | 10/2000 | Anvari et al. | 375/232 |
| 6,188,679 | B1 | | 2/2001 | Sato | 370/335 |
| 6,263,012 | B1 | * | 7/2001 | Zhou et al. | 375/152 |
| 6,473,393 | B1 | * | 10/2002 | Ariyavisitakul et al. | 370/203 |
| 2001/0028676 | A1 | * | 10/2001 | Ohsuge | 375/148 |

OTHER PUBLICATIONS

Hans Kaufmann and Roland Küng, *Digital Spread-Spectrum Multipath-Diversity Receiver For Indoor Communications*, 1992 Proceedings of IEEE VTC, at 1038-1041.

Desmond Yan and Paul Ho, *Acquisition Using Differentially Encoded Barker Sequence In DS/SS Packet Radio*, 1995 Proceedings of IEEE ICC, at 1647-1651.

Ronald A. Iltis, *An EKF-Based Joint Estimator For Interference, Multipath, And Code Delay In A DS Spread-Spectrum Receiver*, 42 IEEE Transactions on Communications, No. 2/3/4, at 1288-1299 (1994).

G. Wetzker and F. Jondral, *Maximum Likelihood Acquisition Of Time and Frequency Shift In Land Mobile DS-CDMA Systems*, 1998 Proceedings of PIMRC, at 1208-1212.

Jari Iinatti, *DS Code Acquisition In Slowly Fading Multi-Path Channel*, 2000 Proceedings of IEEE VTC, at 2408-2413.

Giuseppe Caire, Pierre A. Humblet, Giuseppe Montalbano, and Alessandro Nordio, *Slot Timing Maximum Likelihood Estimation With Bursty Pilot Signals For DS-CDMA In Multipath Fading Channels*, 8 IEEE Journal on Selected Areas in Communications, No. 11, Nov. 2000, at 882-886.

Giuseppe Caire, Pierre A. Humblet, Giuseppe Montalbano, and Alessandro Nordio, *Initial Synchronization Of DS-CDMA Via Bursty Pilot Signals*, 50 IEEE Transactions on Communications, No. 4, Apr. 2002, at 677-685.

* cited by examiner

Primary Examiner—Khanh Tran
(74) Attorney, Agent, or Firm—Thomas, Kayden, Horstemeyer & Risley

(57) ABSTRACT

Based on the MAP criterion, a category of optimal timing estimators is disclosed. These estimators work with known or unknown channel information, and with received information bits over frequency-selective, slowly fading channels. A sub-optimal timing estimator with a k-taps, multiplication-free, finite impulse response (FIR) filter is also disclosed, where k equals 22 when the Barker sequence of length 11 is employed. The sub-optimal estimator is robust with respect to frequency offset impairment. Using simulations, the disclosed timing estimators are demonstrated to be effective. However, in the special case of timing estimation without channel information, in a multi-path channel with a long delay spread, it is disclosed that it is more effective to estimate the received carrier phases and amplitudes of multi-paths before timing estimation.

45 Claims, 15 Drawing Sheets

Case 1: The estimator is capable to locate the received timing.

Case 2: Incapable to locate the received timing as all candidates give similar received energy.

(a) Overall block diagram (b) Correlating branch for $\tau, b(m), b(m-1), b(m-2)$.

(a) Overall block diagram (b) 22-taps FIR filter #$l$, ($b(m), b(m-1)$)

TIMING ESTIMATION OF DIRECT SEQUENCE SPREAD SPECTRUM COMMUNICATIONS SYSTEMS OVER FREQUENCY-SELECTIVE, SLOWLY FADING CHANNELS

BACKGROUND OF THE INVENTION

1. Field of the Invention

The present invention relates to communications systems, and in particular, to transmissions over imperfect channels.

2. Description of Related Art

When a radio frequency communication signal is transmitted, it usually does not follow the straight line path from the sender to the receiver—unless, of course, the two are physically connected, say by a telephone wire. Instead, the signal typically radiates in all directions from the sender. Thus, while some of the radiated signal actually travels a straight line path to the receiver, other portions of the radiated signal may take a more circuitous route, perhaps being deflected off of some physical body en route to the receiver. Consequently, the different portions of the signal that eventually reach the receiver may not arrive simultaneously. This creates a type of distortion known as multi-path distortion. Multi-path distortion is characterized by the fact that multi-path copies of a signal arrive at a receiver, offset in time from each other.

Moreover, these various versions of the signal, and additional signals from sources other than the sender, may introduce interference that tends to distort the signal. The clarity of the signal may be further compromised if the receiver is moving relative to the sender.

A type of radio frequency communication signal that is often utilized is a spread spectrum signal. Spread spectrum signals differ fundamentally from AM or FM radio signals. On the one hand, AM and FM signals have their signal information encoded in a fixed bandwidth assigned to a radio frequency. On the other hand, spread spectrum signals spread the energy contained in a signal across the entire radio frequency spectrum. In addition, in the spread spectrum context multiple signals may co-exist across the radio frequency spectrum, without interfering with each other.

A spread spectrum signal appears as a slight increase in the noise floor, when received by an uncorrelated receiver such as is used to receive AM and FM signals. The signal is correlated to a prescribed code sequence in order to detect the signal.

In a direct sequence spread spectrum transmitter an information containing carrier is modulated by a repeating code sequence. The speed of the code sequence is the chipping rate—measured in chips per second (cps). At the receiver, information from the signal is recovered by multiplying the transmitted signal by a locally generated replica of the code sequence. The replica of the code sequence is applied to the received signal with a set timing relationship.

The circuitry in the receiver that extracts the desired signal is called a spread spectrum correlator. The correlator may be envisioned as a special type of matched filter. The filter only responds to signals encoded with a code that matches its own code, and the receiver is tuned to another signal by changing codes.

Spread spectrum demodulation has two main steps: removing the spectrum spreading modulation—a process known as despreading—and demodulating the signal to extract its information content. Despreading is accomplished satisfactorily when timing synchronization of the spreading code between the transmitter and receiver is achieved.

Synchronization has two components: the initial acquisition of timing information, and the tracking of the timing. Synchronization, or timing information, is typically transmitted with the information content of the signal, and may be affected by any distortion encountered.

One device that is used to help the receiver to home in on the signal is a training sequence. A training sequence is a predetermined signal that is regularly sent as a sort of reference. Thus, the receiver is set to expect that the training sequence has certain predetermined characteristics. If the receiver receives an uncorrupted training sequence, no adjustment to the receiving unit is necessary. However, if there is some deviation from what is expected in the training sequence, the receiver can be adjusted to correct for the error, thus ensuring that when the actual communication signal is sent, it is received without any problem.

It is desirable to use the characteristics of the transmission channel in providing a system and method of estimating timing information. This is especially desirable in frequency-selective, slowly fading channels.

The problem of synchronization of DSSS communications over frequency-selective, fading channels, has not been completely solved. In frequency-selective, fading channels—unlike AWGN channels—estimates of both the received carrier phases and the amplitudes of the multi-paths must be made, whereas phase and amplitude estimates are not utilized in the simpler AWGN model. Moreover, the mutual interference due to multi-paths further complicates the problem of timing recovery. Therefore, there is a significant need for a method and an apparatus that will solve the problem of synchronization in DSSS communications over frequency-selective, fading channels.

While it is useful to estimate the received time, carrier phases, and amplitudes of the factors listed above, the timing estimate tends to play a dominant role in synchronization. The dominance is because the received time provides important prior information that allows the estimation of the received carrier phases and amplitudes. Therefore, to provide improved synchronization in DSSS communications over frequency-selective, fading channels, there is a real need for a method and an apparatus to estimate the received time.

Thus, the embodiments of the present invention provide a method and an apparatus to estimate the received time, by solving the synchronization problem in DSSS communications over frequency-selective, fading channels.

SUMMARY OF THE INVENTION

An embodiment of the present invention provides a method and an apparatus for estimating the received time of a received signal.

Another embodiment of the present invention provides a method and an apparatus for estimating the received time of a received signal transmitted over frequency-selective, slowly fading channels.

Yet another embodiment of the present invention provides a method and an apparatus for estimating the received timing of a direct sequence spread spectrum communications system, over frequency-selective, slowly fading channels.

In certain embodiments of the present invention, optimal timing estimators are disclosed that can be used with either known or unknown channel information, and with received information bits over the frequency-selective, slowly fading channels based on a maximum, a posteriori, probability (MAP) criterion. In addition, an embodiment of the present invention introduces a sub-optimal timing estimator with a 22-taps, multiplication-free, finite impulse response (FIR) filter, which is also robust with respect to frequency offset impairment.

Through the use of simulations, all the timing estimators disclosed in the present invention, have been demonstrated to be effective.

While the present invention can be used either with or without channel information, there are natural limitations in estimating timing when the channel information in the multi-path channel with long delay spread is unknown. In this context it is better to estimate the received carrier phases and the amplitudes of the multi-paths first, and then to estimate the timing.

Many additional features and advantages of the present invention will become apparent to a person of ordinary skill in the art, based on the following discussion of the preferred embodiments. The discussion should, of course, be read in conjunction with the accompanying drawings.

DETAILED DESCRIPTION OF THE INVENTION AND THE DRAWINGS

Figure 1:
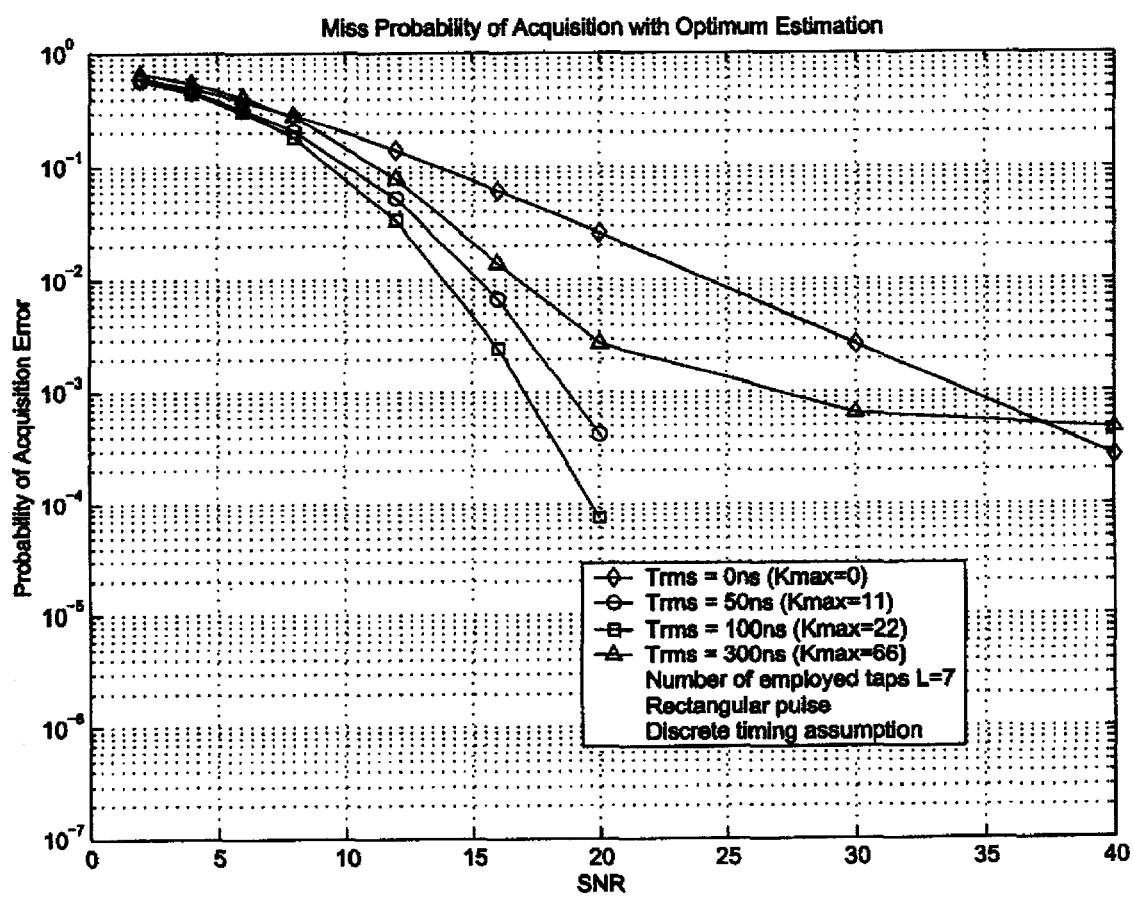
FIG. 1 is a graph that shows the miss probabilities of a one-shot, optimal timing estimator for various multi-path, fading channels.

Lack of signal synchronization should be addressed if the full energy of a sent signal is to be captured by a receiver. The problem arises because of variations in the channel through which the signal passes. If the characteristics of the channel are known in advance, then suitable corrections for its imperfections may be made. Determining channel characteristics is more challenging when the nature of the channel is not well defined.

Central to the reconciliation of the variation among the various versions of the received signal is the estimation of their received times (throughout this disclosure the terms "received time" and "received timing" will be used interchangeably"). The received time is the time one of a plurality of multi-path signals takes to reach the receiver. Once the received times are known, or well estimated, the receiver can correlate the various versions of the signal and sum them together to produce a strong signal containing the full energy of the originally sent signal.

As a simplified example to illustrate the above concept, assume that the original signal radiating out from the transmitter splits and travels in two straight paths and that the first path directly connects the sender and the receiver—i.e. it is the path of minimum distance. Assume further that the second path is to a building off of which the signal is deflected to follow a new straight line to the receiver. This second path is then longer than the first path, and the portion of the signal following it will take longer to reach the receiver than the first did. Therefore, in order to combine the two portions of the signal to capture the full initial signal energy, it is crucial to know the difference in their travel times to the receiver. When the time difference is known, the second signal can be corrected to coincide with the first, and then the two can be combined.

Direct sequence spread spectrum (DSSS) communications systems seek to address the problem just described. DSSS systems are in widespread usage in cellular systems such as IS-95, cdma2000, and 4G cellular systems. DSSS systems are also applied to wireless local area networks (WLAN) and wireless personal area networks (WPAN). DSSS systems are popular because of their interference-rejection ability, inherited frequency diversity—used to combat channel fading impairment—and their capacity for multiple access. These merits of DSSS communications are primarily due to the fact that the transmitted signal is spread by its assigned signature sequence.

A note is in order on terminology. A channel code is a sequence coding on the transmitted information bits, and is used for error correction and protection. That is, the main use of this kind of code is to detect and correct errors when a small portion of the transmitted information bits is erroneously received. For example, block codes such as Reed-Solomon codes are channel codes.

On the other hand, a signature sequence, which is also known as a "spreading code," or a "spreading sequence," or a "direct sequence," is a sequence used to spread the transmitted information bits in spread spectrum communications. The signature sequence can not detect or correct errors in the information bits the way a channel code can. However, by expanding the transmitted spectrum, the signature sequence can be used to mitigate narrow-band interference, though it is ineffective in combating additive white Gaussian noise.

Synchronization of received time, carrier phase, and amplitude, plays a central role in DSSS wireless communication systems. Indeed, synchronization is important to the success of DSSS communications systems, since the benefits derived from signature sequences are diminished if the received timing is erroneously estimated.

In addition to multi-path delays, noise within the path degrades timing estimation. Noise in a path may be modeled with a Gaussian model. In the particular case of an additive white Gaussian noise (AWGN) channel, several synchronization algorithms for DSSS communications have been studied.

Another factor that affects the determination of timing information over a channel, is the fact that a channel tends both to be frequency selective and to cause fading of a signal. A system and method that takes these factors into account will improve the recovery of timing information and signal reception.

The problem of synchronization of DSSS communications over frequency-selective, fading channels, has not been completely solved. In frequency-selective, fading channels—unlike AWGN channels—estimates of both the received carrier phases and the amplitudes of the multi-paths must be made, whereas phase and amplitude estimates are not utilized in the simpler AWGN model. Moreover, the mutual interference due to multi-paths further complicates the problem of timing recovery. Therefore, there is a significant need for a method and an apparatus that will solve the problem of synchronization in DSSS communications over frequency-selective, fading channels.

While it is useful to estimate the received time, carrier phases, and amplitudes of the factors listed above, the timing estimate tends to play a dominant role in synchronization. The dominance is because the received time provides important prior information that allows the estimation of the received carrier phases and amplitudes. Therefore, to provide improved synchronization in DSSS communications over frequency-selective, fading channels, there is a real need for a method and an apparatus to estimate the received time.

Thus, the embodiments of the present invention provide a method and an apparatus to estimate the received time, by solving the synchronization problem in DSSS communications over frequency-selective, fading channels.

To make the disclosure as clear as possible, the disclosure will proceed as follows: the signal model and the assumptions made in constructing the present invention will be explained in Section 1. Section 2 will relax the assumptions of Section 1, and focus on the development of an optimal timing estimation system and method based on the maximum, a posteriori, probability (MAP) criterion. In. Section 3, some simplification is made of the complex results of Section 2, in order to produce a sub-optimal, timing estimator. The validity of the estimator is established through simulations that were conducted by the inventors. The final, fourth section summarizes the conclusions.

The function of the present invention is to estimate the received time of a received signal, and this is done by maximizing the received energy contained in a received signal.

When the channel information is known beforehand, the received signal along a multi-path, is matched with a corresponding, locally generated signal, to produce an output signal—a timing candidate—from which a received timing recovery signal is derived. This is done over a plurality of multi-paths, i.e. each multi-path produces a timing recovery signal. Then the received time of the output timing recovery signal with maximum energy is the received time estimate.

In an alternative embodiment that estimates the received time without channel information, instead of trying to perfectly match the received signal with the locally generated signal, the optimal estimation actually collects the received energy on the multi-paths. Once again, the energy is maximized over the multi-paths to produce the received time.

In either case, the signal is received and run through a conventionally constructed correlator that correlates the received signal with a locally generated signal. The correlator can, for example, be comprised of conventionally constructed finite impulse response (FIR) filters.

Next, the output from the correlator is used to generate a real-valued signal. This is done for each of a plurality of multi-path signals, and a plurality of correlated output signals is linearly combined when coupled to a conventionally constructed, linear combination block that is coupled to the FIR filters. The linear combination is stored in conventionally constructed storage components—each storage component has a storage location that corresponds to a timing candidate.

Finally, a conventionally constructed selector coupled to the storage components, chooses one of a plurality of storage components having a maximum value of energy, and the timing candidate corresponding to that storage component is the one whose timing is taken as the received time.

With this explanatory preface, the details of the invention are now be presented.

1. Signal Model and Assumptions

In the preferred embodiment of the present invention, timing estimations of direct sequence spread spectrum (DSSS) communications systems over frequency-selective, slowly fading channels are developed. As will be appreciated by those skilled in the art, the equations developed are capable of being directly implemented into digital signal processing (DSP) circuitry that directly applies the mathematical functions.

Without loss of generality, and to simplify the discussion, it is assumed that the transmitted signal is "binary phase-shift keying" (BPSK) modulated, which means that it can be written as:

$$\sum_{m=0}^{M-1} b(m)s_{tx}(t-mT),$$

where $b(m) \in \{\pm 1\}$ for $m=0, 1, \ldots, M-1$, and $b(m)=0$ for $m \neq 0, 1, \ldots, M-1$, are the transmitted information bits;

$$s_{tx}(t) \equiv \sum_{n=0}^{N_c-1} d(n)p_{tx}(t-nT_c)$$

is the transmitted signature waveform employed in the spread spectrum communications system; $d(n) \in \Re$ for $n=0, 1, \ldots, N_c-1$ is the employed signature sequence; $p_{tx}(t) \in L^2(-\infty,\infty)$ is the transmitted pulse shape function; $T$ is the symbol duration; and $T_c$ is the chip duration.

While the signature sequences, $d(n)$, are not required to be real-valued, they have been assumed to be real-valued because real-valued sequences such as the Barker sequence in IEEE 802.11b and the Walsh-Hadamard sequences in IS-95 and cdma2000, are often utilized in practical applications. Nevertheless, all the proposed algorithms in the present invention are equally applicable to complex-valued signature sequences provided that suitable modifications known to those skilled in the art, are made.

As will be appreciated by those skilled in the art, since the transmitted signal is band-limited with a null-to-null bandwidth, W, the received low-pass, equivalent signal over the frequency-selective, slowly fading channels with total multipath spread, $T_m$, can be written as:

$$r_{LP}(t) = \sum_{l=0}^{L-1} \tilde{\rho}_l b(m) s_{rx}\left(t - \tilde{\tau} - mT - \frac{l}{W}\right) + z_{LP}(t), \quad (1)$$

where $L \equiv [T_m W] + 1$ is the number of multi-paths in this frequency-selective channel; $\tilde{\rho}_l$ is a time-invariant, complex-valued, Gaussian random variable denoting the received amplitude and carrier phase of the lth multi-path (note that it is assumed that $\tilde{\rho}_l$ is time-invariant throughout the transmission of length M since slowly fading channels are being considered);

$$s_{rx}(t) \equiv \sum_{n=0}^{N_c-1} d(n) p_{rx}(t - nT_c)$$

is the received signature waveform; $p_{rx}(t) \in L^2(-\infty, \infty)$ is the received pulse-shaped function; $\tilde{\tau}$ is the received timing; and $z_{LP}(t)$ is a complex-valued, additive, white Gaussian noise (AWGN) process. The real and imaginary parts of $\tilde{\rho}_l$ are independent, Gaussian random variables with mean 0 and variance $\sigma_l^2/2$ for $l=0, 1, \ldots, L-1$. In particular, to simplify the discussion it is assumed that the received pulse function, $p_{rx}(t)$, is a raised cosine function with a roll-off factor of 0 because in this case, $W=2/T_c$, which agrees with the specifications in IEEE 802.11b. In fact, all the derived algorithms in this disclosure are equally applicable to more general $p_{rx}(t)$ provided that suitable modifications known to those skilled in the art, are made.

In the preferred embodiment of the present invention, the presence of $p_{rx}(t)$ for $t \notin [0, T_c)$ is ignored, in order to simplify the development. This simplification does not lead to any loss of generality, since it tends to provide a good approximation of practical pulses for band-limited channels, such as root raised cosine functions.

2. Optimal Timing Estimation of DSSS Communications Systems Over Frequency-selective, Slowly Fading Channels (a) Optimal Timing Estimation with Known Channel Information and Known Training Sequences To simplify the discussion in this section, known received amplitudes and known carrier phases of the multi-path channel (i.e. known $\tilde{\rho}_l$ for $l=0, 1, \ldots, L-1$) are assumed. In addition, a knowledge of a plurality of received information sequences (or training sequences) as is the case in many practical, wireless communications systems, is assumed. These assumptions will then be relaxed in subsections (b) and (c).

Because the null-to-null bandwidth of the received signal is $2/T_c$, the received, low-pass, equivalent signal, $r_{LP}(t)$, is sampled at a rate of $2/T_c$, to avoid losing any information. According to the Nyquist criterion:

$$r(m, n, q) \equiv r_{LP}\left(mT + nT_c + \frac{qT_c}{2}\right) \quad (2)$$

$$= \sum_{l=0}^{L-1} \tilde{\rho}_l b(m - \tilde{\alpha}_{l,n,q}) d\left((n - \tilde{\beta}_{l,q})_{N_c}\right) p_{rx}\left(\left((q-1)\frac{T_c}{2} - \tilde{\tau}\right)_{T_c}\right) + z(m, n, q),$$

where $$\tilde{\alpha}_{l,n,q} = \alpha \quad \text{if} \quad -\alpha T \leq nT_c + (q-l)\frac{T_c}{2} - \tilde{\tau} < -(\alpha-1)T; \quad (3)$$

$$\tilde{\beta}_{l,q} = \beta \quad \text{if} \quad -\beta T_c \leq \left((q-l)\frac{T_c}{2} - \tilde{\tau}\right)_T < -(\beta-1)T_c; \quad (4)$$

$$z(m, n, q) \equiv z_{LP}\left(mT + nT_c + \frac{qTc}{2}\right)$$

is a sequence of independent and identically distributed, Gaussian random variables whose real and imaginary parts are independent, Gaussian random variables with mean 0 and variance $N_0 W$; $N_0/2$ is the two-sided, power spectral density of the AWGN noise; and $(\cdot)_x$ denotes $(\cdot)$ mod x. The optimal timing estimation based on the maximum, a posteriori (MAP), probability criterion is therefore $$\hat{\tau}_{opt} = \underset{\tau}{\text{argmax}} \, Pr(r(m, n, q) | \tau) \quad (5)$$

$$= \underset{\tau}{\text{argmax}} \sum_m \sum_{n=0}^{N_c-1} \sum_{q=0}^{1} \text{Re}\left\{r^*(m, n, q) \sum_{l=0}^{L-1} \tilde{\rho}_l b(m - \alpha_{l,n,q}) d\left((n - \beta_{l,q})_{N_c}\right) p_{rx}\left(\left((q-l)\frac{T_c}{2} - \tau\right)_{T_c}\right)\right\},$$

where $$\alpha_{l,n,q} = \alpha \quad \text{if} \quad -\alpha T \leq nT_c + (q-l)\frac{T_c}{2} - \tau < -(\alpha-1)T; \quad (6)$$

$$\beta_{l,q} = \beta \quad \text{if} \quad -\beta T_c \leq \left((q-l)\frac{T_c}{2} - \tau\right)_T < -(\beta-1)T_c; \quad (7)$$

and the superscript * stands for complex conjugation.

The proposed scheme in (5) is based on the observation of M receiving symbols that are used to estimate the received time, $\tilde{\tau}$, by matching the received, sampled sequence with different, locally generated sequences based on timing candidates, $\tau$.

The MAP criterion applied here, arises from solving the following hypothesis test. Let N denote the number of timing candidates employed. Then the corresponding N-ary hypothesis testing formula is:

$$\begin{aligned} H_0 &: \text{received timing } (\tilde{\tau}) = 0 \\ H_1 &: \text{received timing } (\tilde{\tau}) = \frac{T}{N} \\ &\vdots \qquad \vdots \qquad \vdots \\ H_n &: \text{received timing } (\tilde{\tau}) = \frac{nT}{N} \\ &\vdots \qquad \vdots \qquad \vdots \\ H_{N-1} &: \text{received timing } (\tilde{\tau}) = \frac{(N-1)T}{N}. \end{aligned}$$

Let r(m,n,q) denote the samples of the received, low-pass, equivalent signal. Then the above hypothesis test is equivalent to:

$$H_0 : r(m, n, q) = \sum_{l=0}^{L-1} \tilde{\rho}_l b(m - \tilde{\alpha}_{l,n,q}) d\big((n - \tilde{\beta}_{l,q})_{N_c}\big) p_{rx}\left(\left((q-l)\frac{T_c}{2} - 0\right)_{T_c}\right) + z(m, n, q)$$

$$H_1 : r(m, n, q) = \sum_{l=0}^{L-1} \tilde{\rho}_l b(m - \tilde{\alpha}_{l,n,q}) d\big((n - \tilde{\beta}_{l,q})_{N_c}\big) p_{rx}\left(\left((q-l)\frac{T_c}{2} - \frac{T}{N}\right)_{T_c}\right) + z(m, n, q)$$

$$\vdots \qquad \vdots \qquad \vdots \qquad \vdots$$

$$H_n : r(m, n, q) = \sum_{l=0}^{L-1} \tilde{\rho}_l b(m - \tilde{\alpha}_{l,n,q}) d\big((n - \tilde{\beta}_{l,q})_{N_c}\big) p_{rx}\left(\left((q-l)\frac{T_c}{2} - \frac{nT}{N}\right)_{T_c}\right) + z(m, n, q)$$

$$\vdots \qquad \vdots \qquad \vdots \qquad \vdots$$

$$H_{N-1} : r(m, n, q) = \sum_{l=0}^{L-1} \tilde{\rho}_l b(m - \tilde{\alpha}_{l,n,q}) d\big((n - \tilde{\beta}_{l,q})_{N_c}\big) p_{rx}\left(\left((q-l)\frac{T_c}{2} - \frac{(N-1)T}{N}\right)_{T_c}\right) + z(m, n, q),$$

where z(m,n,q) is a sequence of independent and identically distributed, Gaussian random variables with mean 0 and variance $N_0 W$.

When the received amplitudes and phases in the multi-path components, $\tilde{\rho}_l$ are known to the receiver, the probability density function, r(m,n,q), of the received samples in each hypothesis, is a single function instead of a set of functions. Therefore, in this setting the problem reduces to a simple hypothesis test, and the MAP estimate of the received timing is the timing candidate with the maximum likelihood function, when it is assumed that the a priori distribution of $\tilde{\tau}$ is uniform over [0,T).

On the other hand, the one-shot realization, which estimates the received timing based on observing the samples within a symbol, can be written as:

$$\hat{\tau}_{opt}(m) = \qquad (8)$$

-continued $$\arg\max_{\tau \in [0,T)} \sum_{n=0}^{N_c-1} \sum_{q=0}^{1} \text{Re}\left\{ r^*(m, n, q) \sum_{l=0}^{L-1} \tilde{\rho} b(m - \alpha_{l,n,q}) d\big((n - \beta_{l,q})_{N_c}\big) \right.$$

$$\left. p_{rx}\left(\left((q-1)\frac{T_c}{2} - \tau\right)_{T_c}\right) \right\}.$$

The term "energy" usually refers to the square sum of the signal magnitude within a symbol. However, it can also be used to denote the sum of the signal magnitude within a symbol, and the real part of the correlated output. For example, in equation (8) above, the energy is the real part of the correlated signal, instead of the sum or the square sum of the signal magnitude.

Adopting the multi-path, channel model employed in IEEE 802.11a and IEEE 802.11b, a simulation was conducted to verify the performance of the present embodiment of a one-shot, optimal timing estimator. In this simulation, the employed signature sequence was the Barker sequence of length 11, and the $p_{rx}(t)$ were assumed to be rectangular pulses with support [0,$T_c$). In addition, the number of timing candidates was 22 and the received time was assumed to be a discrete random variable, uniformly distributed over these 22 timing candidates.

FIG. 1 shows the miss probability of this proposed one-shot, optimal timing estimator for various multi-path channels. As can be seen in the figure, the channel with the largest delay spread outperformed the smaller ones. This superior performance is primarily due to the larger frequency-diversity provided by the multi-path channels with larger delay spread, and the larger frequency-diversity in turn is used to combat fading impairment. It is particularly noteworthy to observe the degradation of performance associated with the simulation curve with delay spread 300 nsec. This degradation is due to the receiving of 66 multi-paths with 7 rays.

At the beginning of the discussion of this subsection, knowledge of the received information sequences, the received amplitudes, and the carrier phases of the multi-paths, was temporarily assumed. These two assumptions will now be relaxed. First, in Subsection 2 (b) known received information sequences, but unknown channel information, shall be assumed. Then in Subsection 2 (c) it shall be assumed that both the received information sequence and the channel information are unknown.

(b) Optimal Timing Estimation with Known Received Information Sequence and Unknown Channel Information When the received amplitudes and carrier phases of the multi-paths are unknown to the timing estimator, the optimal timing estimation based on the MAP criterion is derived according to a composite hypothesis test rather than the simple hypothesis test discussed above. Of course, the overall structure of the hypotheses is the same, but now the probability density function, r(m,n,q), of the received samples in each hypothesis, is a set of functions instead of a single function.

To be more precise, in this setting the unknown parameters $\{\tilde{\rho}_l | l=0, 1, \ldots, L-1\}$ can be modeled as complex-valued, Gaussian random variables. Then the probability density function in each hypothesis is a set of functions indexed by the parametric set, $\Phi \equiv \{\tilde{\rho}_l | l=0, 1, \ldots, L-1\}$, instead of a single function. For example, the probability density function, r(m,n,q), of the received samples in the null hypothesis, $H_0$, is the set $\{Pr(r(m,n,q)|\tau=0, \rho_0, \rho_1, \ldots, \rho_{L-1}), \text{where } \{\rho_0, \rho_1, \ldots, \rho_{L-1}\} \epsilon \Phi\}$.

Therefore the hypothesis test in this case is a composite one, and the optimal timing estimate based on the MAP criterion is calculated by maximizing the likelihood function averaged over the parametric set $\Phi$.

Thus, the way composite hypothesis testing is used to estimate the received time without channel information, is first to average the likelihood function over the unknown parameters, and then to choose the timing candidate with maximum likelihood. That is, $$\hat{\tau}_{non}(m) = \arg\max_{\tau \in [0,T)} Pr(r(m, n, q) | \tau) \quad (9)$$

$$= \arg\max_{\tau \in [0,T)} \int \int \cdots \int Pr(r(m, n, q) | \tau, \rho_0, \rho_1 \cdots,$$

$$\rho_{L-1}) \prod_{l=0}^{L-1} p(\rho_l) d\rho_0 d\rho_1 \cdots d\rho_{L-1},$$

where $p(\rho_l)$ is the probability density function of $\tilde{\rho}_l$.

The corresponding optimal, one-shot timing estimator without channel information, is:

$$\hat{\tau}_{non}(m) = \arg\max_{\tau \in [0,T)} \sum_{l=0}^{L-1} \left| \sum_{n=0}^{N_c-1} \sum_{q=0}^{1} r(m, n, q) \hat{s}_l^{(\tau)}(m, n, q) \right|^2 \hat{\sigma}_l^2, \quad (10)$$

where $$s_l^{(\tau)}(m, n, q) \equiv b(m - \alpha_{l,n,q}) d((n - \beta_{l,q})_{N_c}) p_{rx}\left(\left((q-1)\frac{T_c}{2} - \tau\right)_{T_c}\right) \quad (11)$$

$$l = 0, 1, \cdots, L-1;$$

$$p_\tau^2(l) \equiv \sum_{n=0}^{N_c-1} \sum_{q=0}^{1} p_{rx}^2\left(\left((q-1)\frac{T_c}{2} - \tau\right)_{T_c}\right) \, l = 0, 1, \cdots, L-1; \quad (12)$$

$$\hat{\sigma}_l^2 \equiv \frac{\sigma_l^2}{1 + \frac{\hat{p}_\tau^2(l)\sigma_l^2}{2N_0 W}} \, l = 0, 1, \cdots, L-1; \quad (13)$$

-continued $$\begin{cases} \hat{s}_0^{(\tau)}(m, n, q) \equiv s_0^{(\tau)}(m, n, q) \\ \hat{s}_l^{(\tau)}(m, n, q) \equiv s_l^{(\tau)}(m, n, q) - \sum_{i=0}^{l-1} R_\tau(i, l) \frac{\hat{\sigma}_i^2}{2N_0 W} \hat{s}_i^{(\tau)}(m, n, q) \\ l = 1, 2, \cdots, L-1; \end{cases} \quad (14)$$

$$R_\tau(i, l) = \quad (15)$$

$$\begin{cases} \sum_{n=0}^{N_c-1} \sum_{q=0}^{1} \hat{s}_i^{(\tau)}(m, n, q) s_l^{(\tau)}(m, n, q) & \text{for } i < l, l = 1, 2, \cdots, L-1; \\ 0 & \text{otherwise} \end{cases}$$

and $$\begin{cases} \hat{p}_\tau^2(0) = \hat{p}_\tau^2(0) \\ \hat{p}_\tau^2(l) = p_\tau^2(l) - \sum_{i=0}^{l-1} R_\tau^2(i, l) \frac{\hat{\sigma}_i^2}{2N_0 W} \quad l = 1, 2, \cdots, L-1. \end{cases} \quad (16)$$

When the multi-paths do not interfere with each other, i.e. when $\Sigma_{n=0}^{N_c-1} \Sigma_{q=0}^{1} s_i^{(\tau)}(m,n,q) s_l^{(\tau)}(m,n,q) = 0$ for $i \neq l$, the optimal, one-shot timing estimator without channel information, is simplified to be:

$$\hat{\tau}_{non}(m) = \arg\max_{\tau \in [0,T)} \sum_{l=0}^{L-1} \left| \sum_{n=0}^{N_c-1} \sum_{q=0}^{1} r(m, n, q) s_l^{(\tau)}(m, n, q) \right|^2 \sigma_l^2 \quad (17)$$

$$\arg\max_{\tau \in [0,T)} \sum_{l=0}^{L-1} \left| \sum_{n=0}^{N_c-1} \sum_{q=0}^{1} r(m, n, q) b(m - \alpha_{l,n,q}) d((n - \beta_{l,q})_{N_c}) \right.$$

$$\left. p_{rx}\left(\left((q-1)\frac{T_c}{2} - \tau\right)_{T_c}\right) \right|^2 \sigma_l^2.$$

In the timing estimation with channel information described in equation (8), the received sequence, r(m,n,q), was matched with the candidate sequence, $$\sum_{l=0}^{L-1} \tilde{\rho}_l b(m - \alpha_{l,n,q}) d((n - \beta_{l,q})_{N_c}) p_{rx}\left(\left((q-l)\frac{T_c}{2} - \tau\right)_{T_c}\right),$$

which was generated from a knowledge of the channel information, $\tilde{\rho}_l$, and the timing candidate, $\tau$. However, unlike the fine matching in equation (8), in equation (17), there is a lack of channel information. Therefore, in equation (17), the coarse matching without channel information, of the received sequence, r(m,n,q), to the candidate, $$b(m - \alpha_{l,n,q}) d((n - \beta_{l,q})_{N_c}) p_{rx}\left(\left((q-l)\frac{T_c}{2} - \tau\right)_{T_c}\right),$$

is performed and the results linearly combined according to the received energy on each multi-path, at least when the multi-paths do not interfere with one another.

Figure 2:
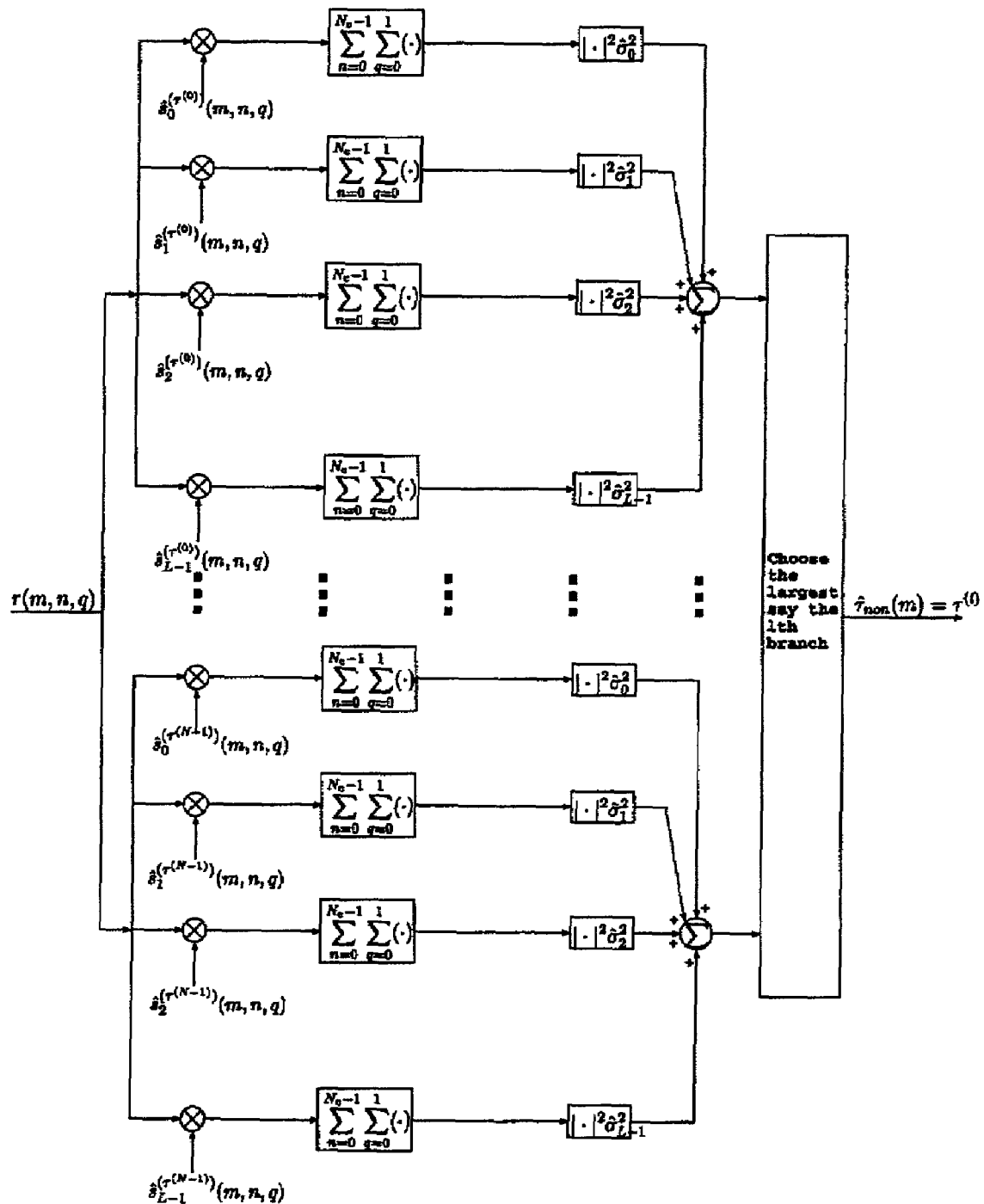
FIG. 2 is a block diagram of an optimal, one-shot, data-aided timing estimation without channel information.

FIG. 2 is a block diagram of an embodiment of an optimal, one-shot, data-aided timing estimation without channel information. When the multi-paths do interfere with one another, the optimal, one-shot timing estimation is modified to produce equation (10), where $\{\hat{s}_l^{(\tau)}(m,n,q)|l=0, 1, \ldots, L-1\}$ can be regarded as the interference-free representation of $\{s_l^{(\tau)}(m,n,q)|l=0, 1, \ldots, L-1\}$.

The inventors conducted a series of experiments, each comprised of several simulations. The experiments illustrate the performance of multi-path channels with various delay spreads, and verify the performance of the proposed timing estimator. As in the experiment in the previous subsection, a "binary phase-shift keying" (BPSK) modulated signal was used, spread by the Barker sequence of length 11 over the multi-path channels as employed in IEEE 802.11b.

Figure 3:
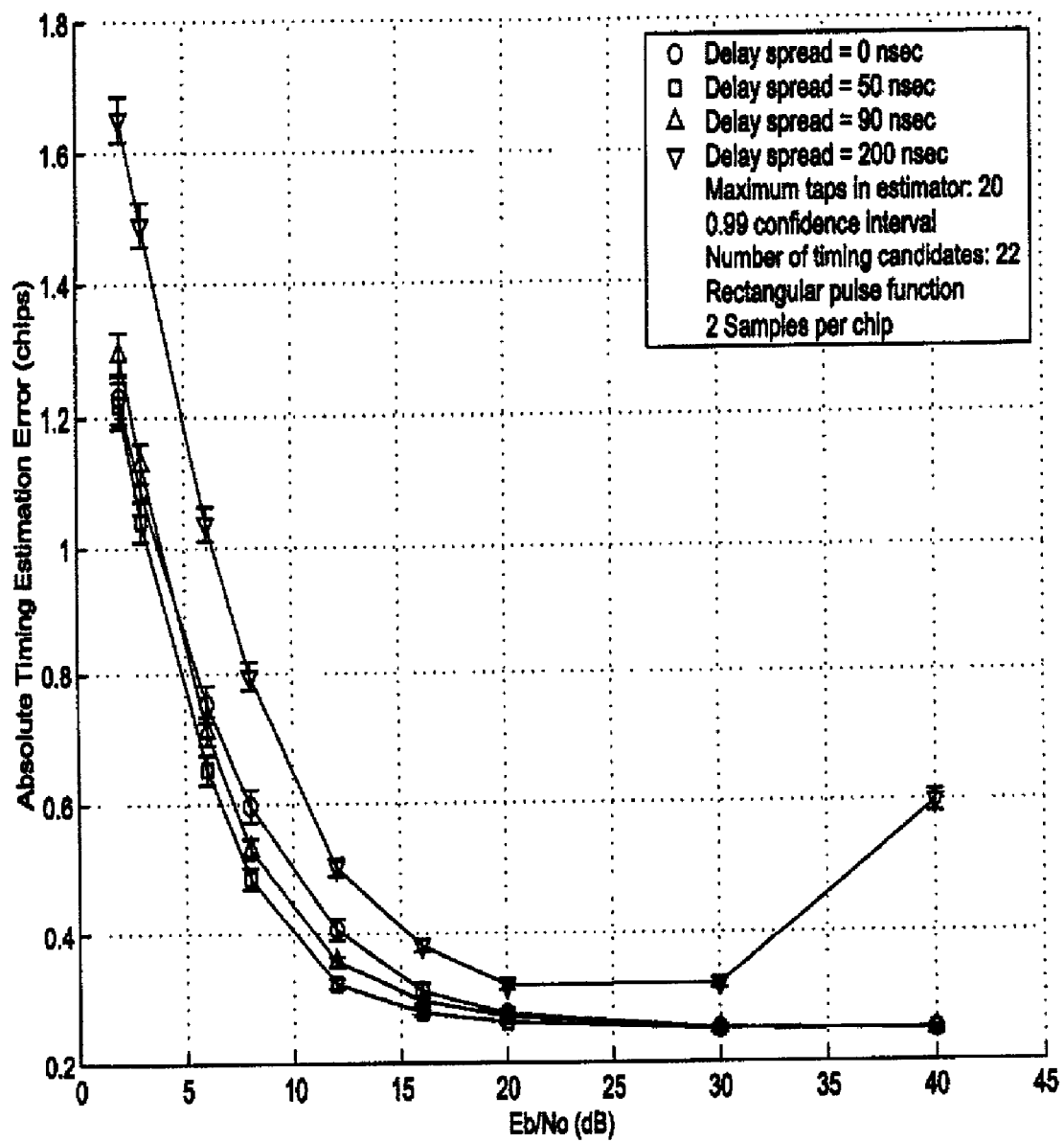
FIG. 3 is a graph that shows simulation results for optimal timing estimation over multi-path, fading channels.

FIG. 3 is a graph that shows the simulation results for the first simulation: optimal timing estimation over multi-path, fading channels. As shown in the figure, when using a multi-path combination to mitigate channel fading impairment, the channel with the largest delay spread outperforms those with smaller delay spreads. It is worth noting that when channel information is known, this result coincides with that shown in FIG. 1.

Unfortunately, there is a natural weakness in this optimal timing estimation without channel information. The estimator is unable to provide the received time when it uses a large number, L, of receiving rays in the multi-path channel with a long delay spread. The receiving rays are the considered multi-paths on the receiving side. The number of receiving rays is usually smaller than the total number of multi-paths in the channel.

Figure 4:
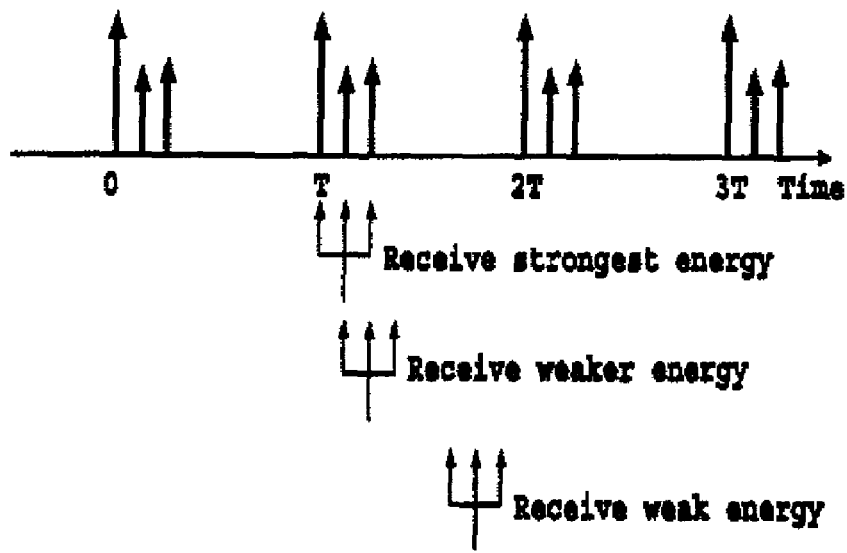
FIG. 4 shows examples that demonstrate the unfeasibility of timing estimation when receiving with a large L, over a long delay spread channel.
Figure 4:
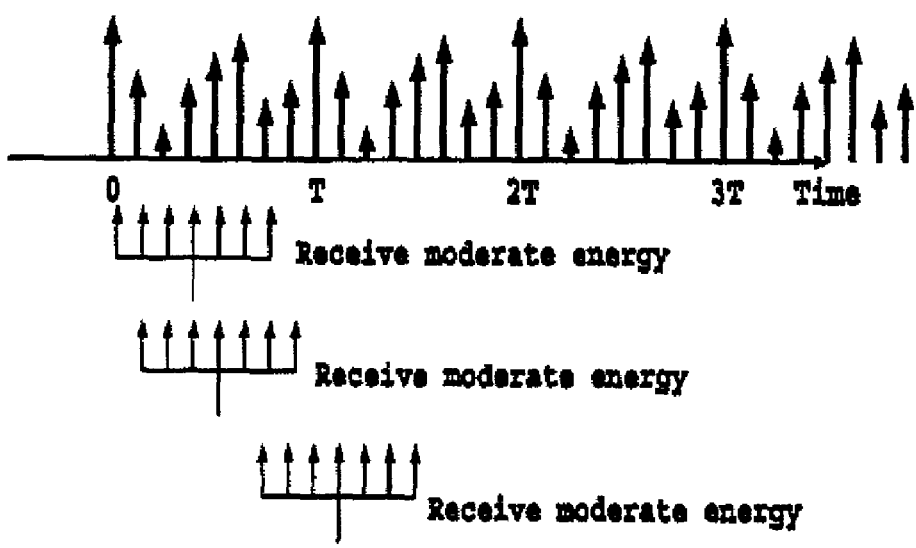

FIG. 4 shows examples that demonstrate the unfeasibility of timing estimation when receiving with a large L, over a long delay spread channel. This deficiency in optimal timing estimation without channel information, can be explained as follows: Since the optimal timing estimation with unknown channel information merely collects the energy in the multi-paths according to the received sequence, it can not identify the beginning of the received symbol when it uses a large number of receiving rays in multi-path channels with a long delay spread.

However, because of the fast power degradation of long delay spread multi-paths, it is reasonable to ignore these multi-paths. Therefore, a reasonable compromise is to choose, a priori, the number, L, of receiving rays. However, in selecting a suitable number of receiving rays, it is important to keep in mind that choosing too large an L may lead to a degradation of the ability to lock onto the received time, and choosing too small an L means that since multi-paths, l, for $l \geq L$, are ignored, there will be a degradation in performance.

Figure 5:
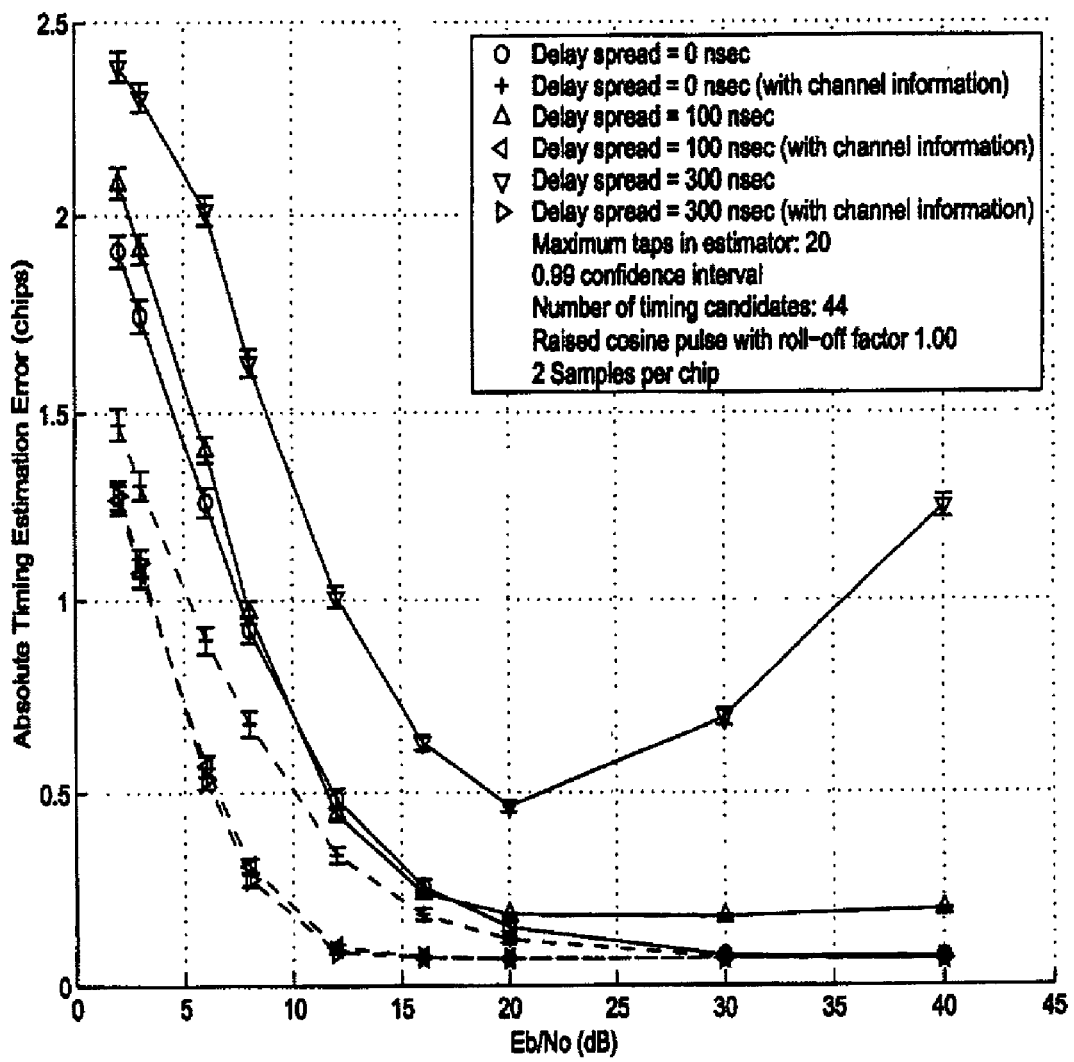
FIG. 5 is a graph that shows simulation results comparing optimal timing estimation, with and without channel information.

FIG. 5 is a graph that shows the simulation results of the second simulation, and compares the performance differences between optimal timing estimation with and without channel information. This experiment uses the same parameters as the previous one except that the number of timing candidates per chip is now 4, and a raised cosine pulse with a roll-off factor of 1 is the received pulse, $p_{rx}(t)$.

The results shown in the figure lead to an important conclusion: the performance gain due to known channel information is much greater in channels with larger delay spreads.

Figure 6:
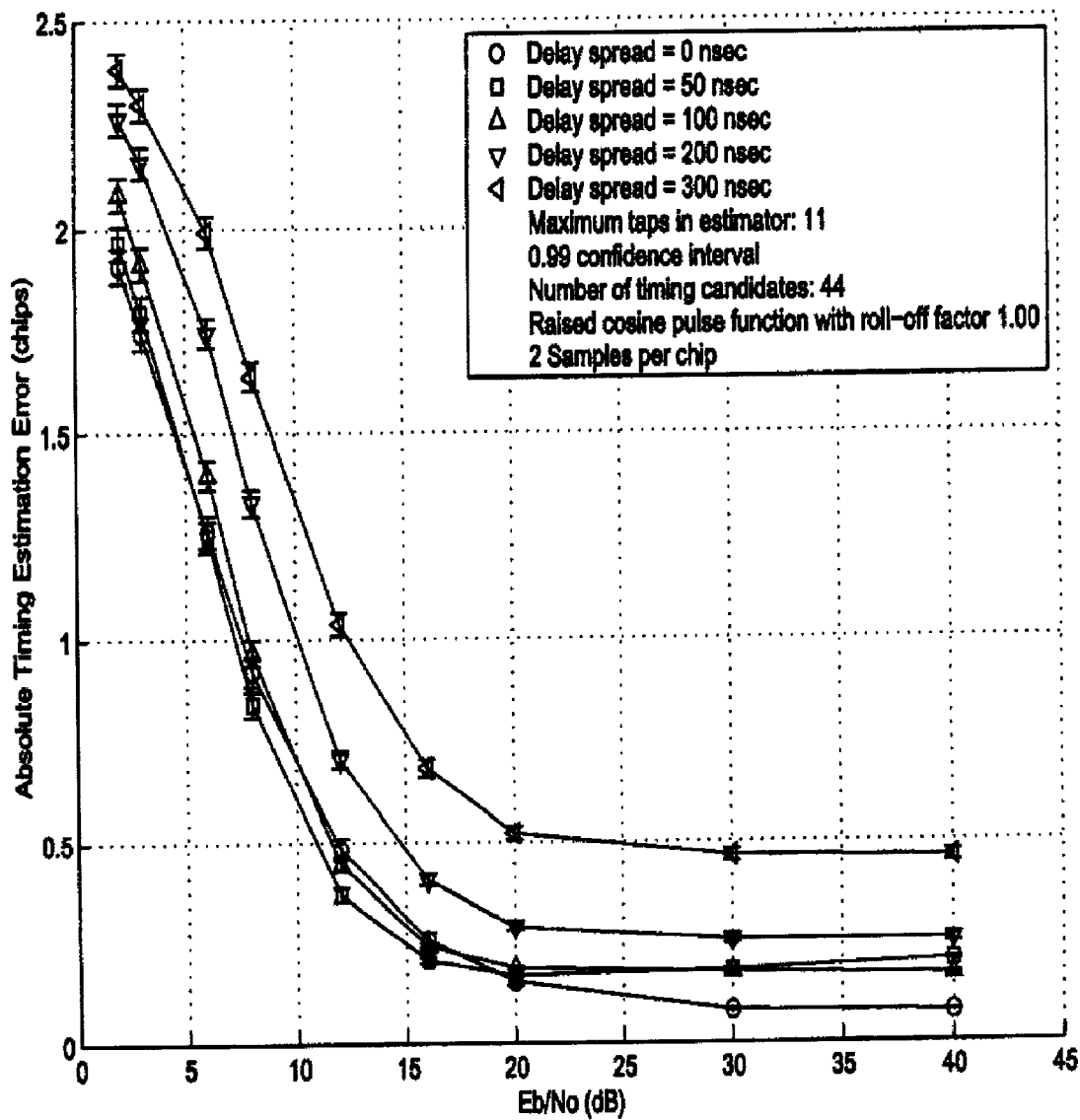
FIG. 6 is a graph that shows simulation results for optimal timing estimation without channel information.

FIG. 6 is a graph that shows the simulation results of the third and last simulation in this subsection: optimal timing estimation without channel information. They show the performances for multi-path channels with delay spreads of up to 300 nsec. The simulation parameters are similar to those in the second experiment, except that the number of maximal receiving rays is 11. Note that the figure shows optimal timing estimation without channel information. The timing estimation error for a 300 nsec delay spread is less than 0.45 chips, which is good enough for any succeeding blocks such as the tracking algorithms.

(c) Optimal Joint Timing Estimation and Differential Detection with Unknown Channel Information and an Unknown Received Information Sequence In Subsection 2 (b), only the first assumption—known received amplitudes and carrier phases—made in Subsection 2 (a), was relaxed, in order to introduce the optimal timing estimation without channel information. In this subsection, both assumptions are relaxed, to disclose the optimal timing estimation with both unknown channel information and unknown received information bits. This scheme also detects phase variation in contiguous symbols, simultaneously.

When the received information sequence is unknown to the timing estimator, the optimal, one-shot, timing estimation based on the MAP criterion is:

$$\hat{\tau}_{bld}(m) = \arg \max_{\substack{\tau \in [o,T) \\ b(0) \in \pm 1 \\ b(1) \in \pm 1 \\ \vdots \\ b(M-1) \in \pm 1}} Pr(r(m, n, q) | \tau, b(0), b(1), \ldots, b(M-1)). \quad (18)$$

The complexity of this estimation grows exponentially as a function of the number, M, of transmitted information bits.

Fortunately, in the one-shot, timing estimation, not all of the M symbols are related to the timing estimation in the mth symbol. For example, for the modest goal of resolving the multi-paths within a symbol duration, the only information bits affecting the timing estimation in the mth symbol are b(m), b(m−1), and b(m−2).

As discussed in Subsection 2 (b), due to the nature of timing estimation without channel information in multi-path channels, trying to resolve too many multi-paths degrades the performance. Therefore, it is reasonable to ignore the presence of multi-paths beyond a pre-specified symbol. In addition, because there is an absolute value operation in the optimal timing estimation without channel information, as seen in equation (19) below, the number of combinations of received information bits is further reduced from 8 to 4.

$$\begin{aligned}\hat{\tau}_{bld} &= \arg \max_{\substack{\tau \in [0,T) \\ (b(m),b(m-1),b(m-2)) \\ \in \{(-1,-1,-1) \\ (-1,-1,1) \\ (-1,1,-1) \\ (-1,1,1)\}}} Pr(r(m, n, q) | \tau, b(m), b(m-1), b(m-2)) \quad (19)\\ &= \arg \max_{\substack{\tau \in [0,T) \\ (b(m),b(m-1),b(m-2)) \\ \in \{(-1,-1,-1) \\ (-1,-1,1) \\ (-1,1,-1) \\ (-1,1,1)\}}} \sum_{l=0}^{L-1} \left| \sum_{n=0}^{N_c-1} \sum_{q=0}^{1} r(m, n, q) \hat{s}_l^{(\tau)}(m, n, q) \right|^2 \hat{\sigma}_l^2\end{aligned}$$

Figure 7:
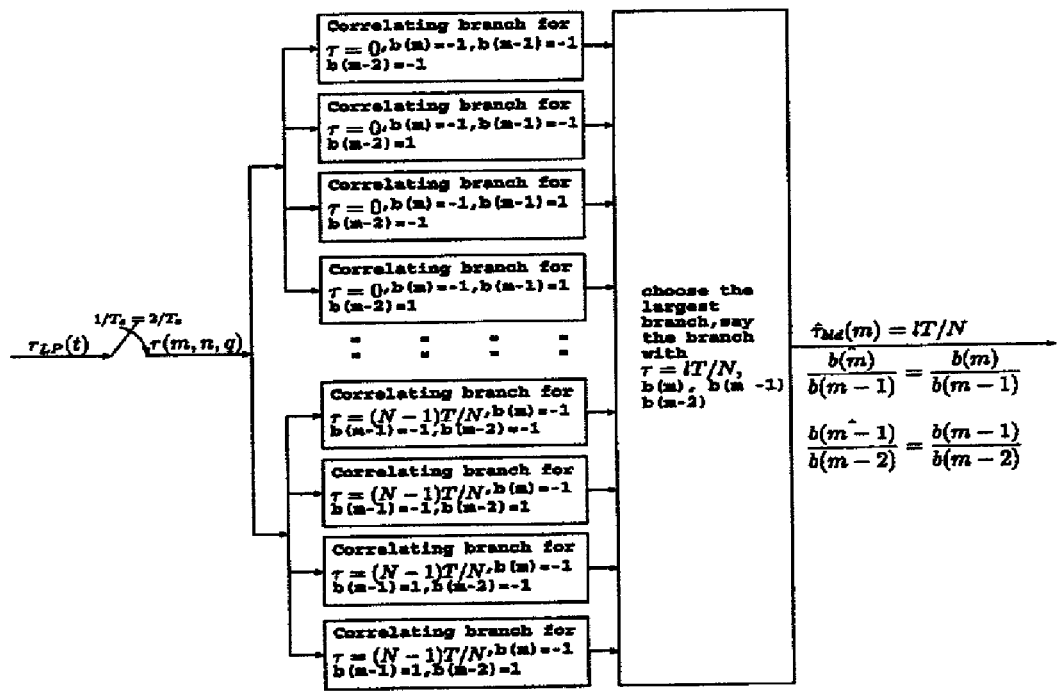
FIG. 7 is a block diagram of an optimal, one-shot, joint timing estimation, with unknown channel information and received information bits.
Figure 7:
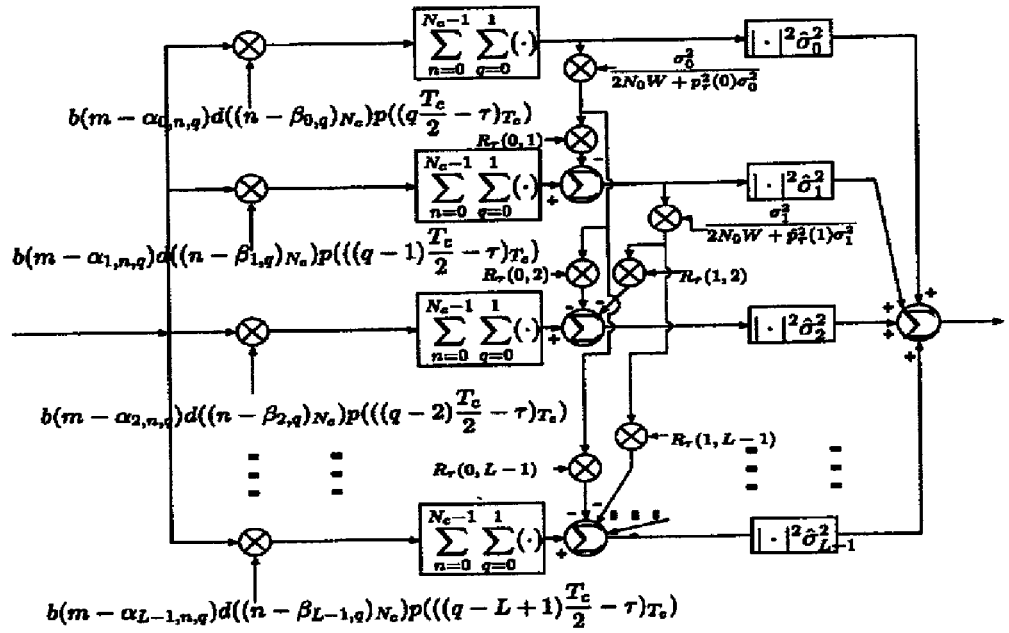

FIG. 7 includes a block diagram for optimal, one-shot timing estimation with unknown channel information and received bits. This estimation requires a bank of 4NL correlators, where N is the number of timing candidates and L is the number of receiving rays. In fact, the number of distinct correlators shown in the figure is $$4\left(N + \frac{N(L-1)}{22}\right).$$

Figure 8:
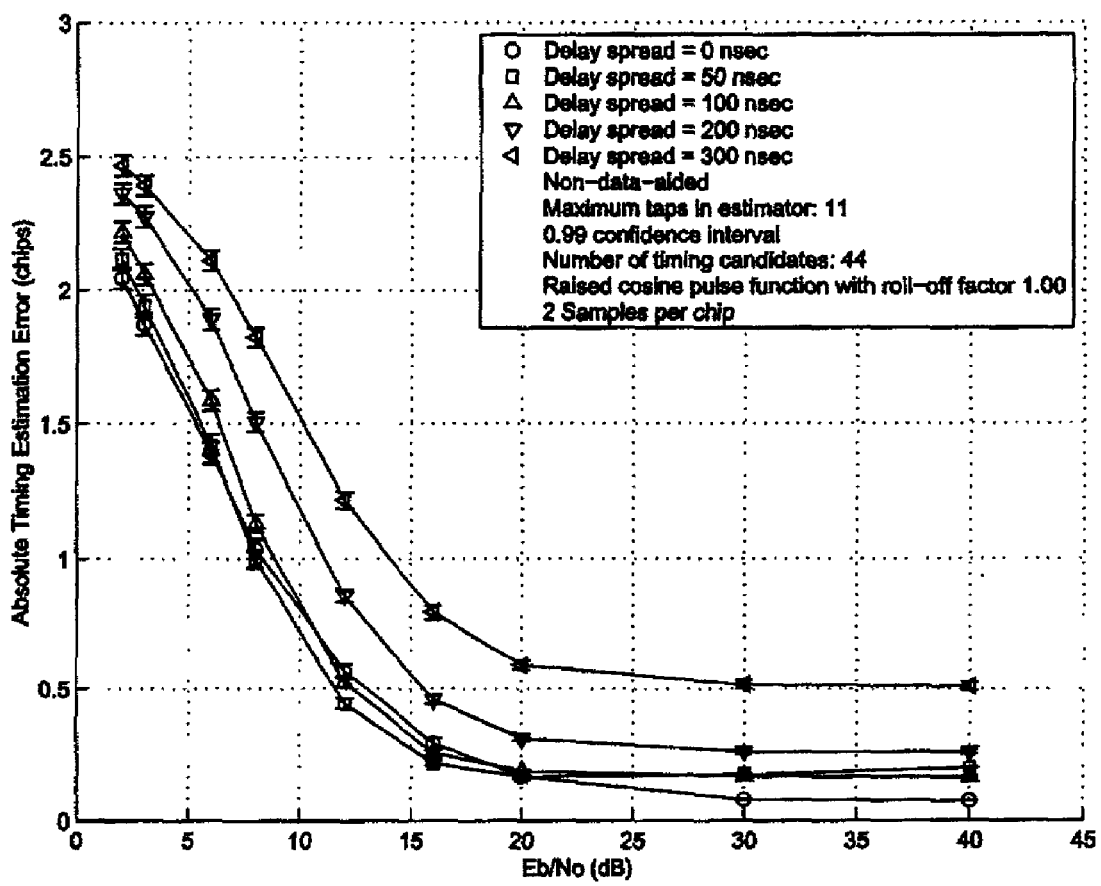
FIG. 8 is a graph that shows simulation results for non-data-aided, optimal timing estimation without channel information.

FIG. 8 plots the results of a series of simulations conducted by the inventors, that demonstrate the effectiveness of this timing estimation. The performance degradation due to unknown received information bits is around 2 to 3 dB.

3. Sub-Optimal Timing Estimation of DSSS Communications Systems Over Frequency-Selective, Slowly Fading Channels Various optimal timing estimations based on the MAP criterion were disclosed in the previous section. In the present section a sub-optimal timing estimator with unknown channel information and unknown received information bits is disclosed. This new estimator is a simplification of the earlier optimal estimators discussed above, making it easier to use in practical applications.

(a) A Simplified Realization

Figure 9:
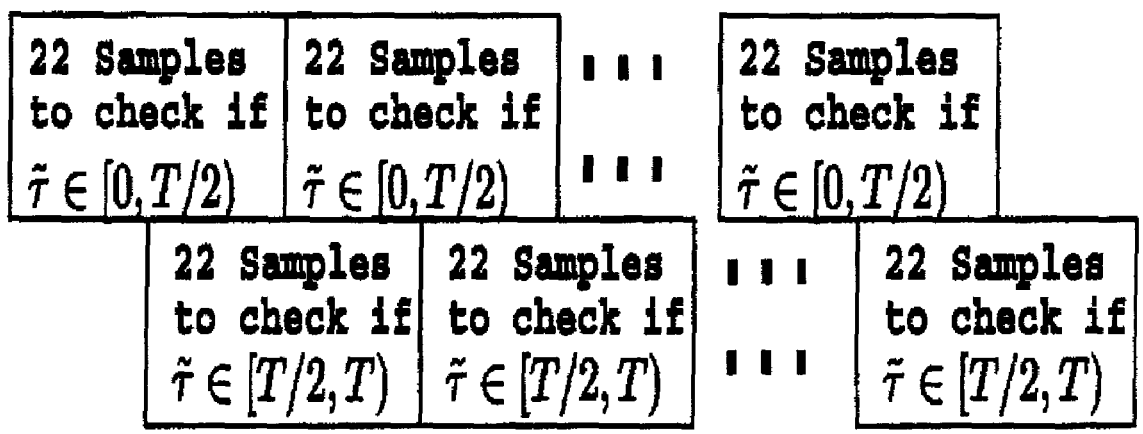
FIG. 9 is a conceptual plot of a simplified, non-data-aided timing estimation.
Figure 10:
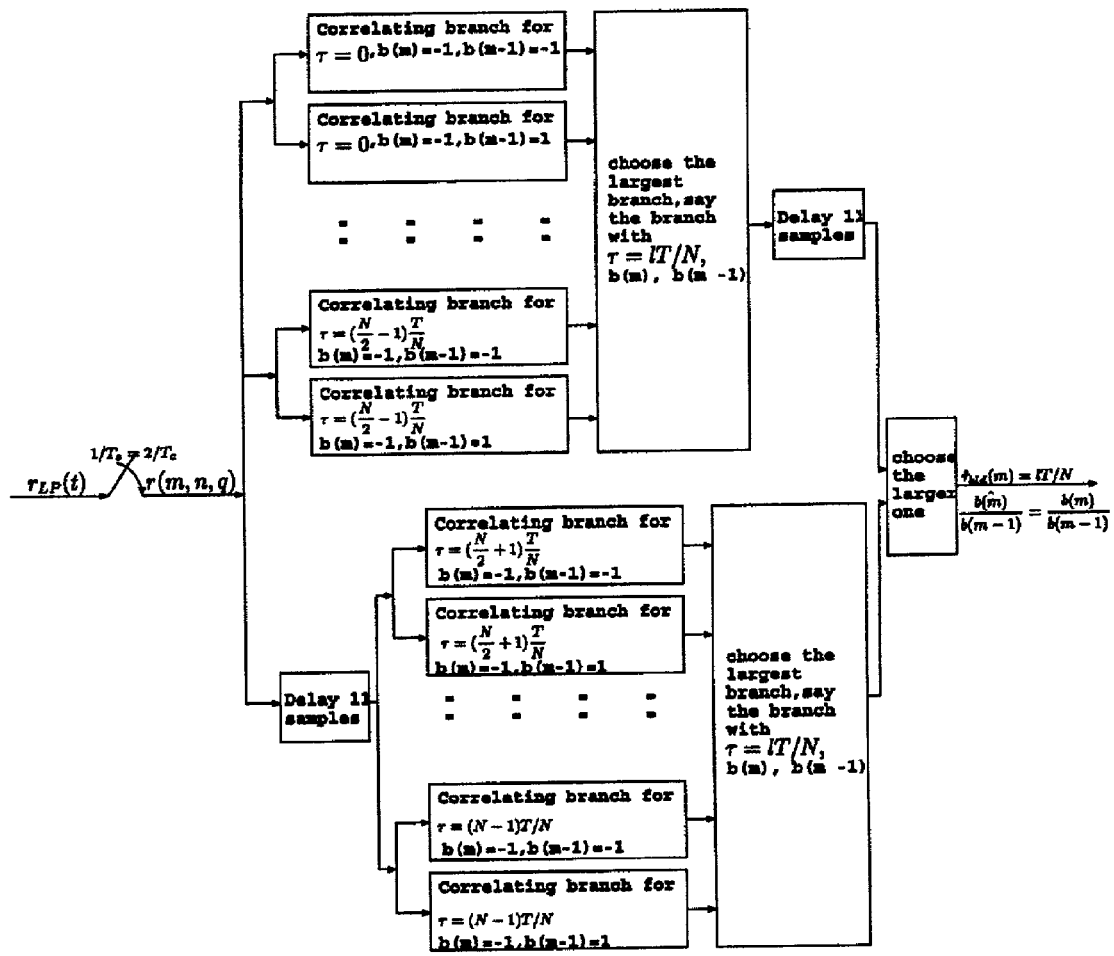
FIG. 10 is a block diagram of a simplified realization of an optimal, one-shot, joint differential detection and timing estimation, without channel information.

The disclosed optimal timing estimation of Section 2 required a bank of 4NL correlators, where the factor of 4 came from the four possible combinations of the three symbols b(m), b(m−1), and b(m−2) that affect the timing estimation of the mth symbol. As discussed in Subsection 2 (c), although there are eight possible combinations, this number is reduced to four because of the absolute value operation in equation (19). Therefore, if the received time lies in the interval [0,T/2), and if the multi-paths for $lT_c/2 > T/2$ are ignored, then the information symbols which affect the timing estimate, $\hat{\tau}_{bld}(m)$, are b(m) and b(m−1), and the number of correlators required for the timing estimation is reduced to 2NL. FIG. 9 is a conceptual plot of a simplified, non-data-aided timing estimation. FIG. 10 is a block diagram of a simplified realization of an optimal, one-shot, joint differential detection and timing estimation, without channel information.

The important lesson to be learned from this simplified structure is found in the serial implementation of the timing estimation. Since the upper and lower filter banks are identical, one of the filter banks can be ignored. This simplification comes from splitting the received timing into the two subintervals, [0,T/2) and [T/2,T).

Even further simplification is possible. When the number of timing candidates is twice that of the spread gain, N, which is the same as the number of samples per symbol, the received timing can be further split into the half-open subintervals, $\{[lT_c/2, (l+1)T_c/2)| l=0,1,\ldots,N_c-1\}$.

In the following subsections, two sub-optimal timing estimators are disclosed: one with 2L-correlators and one with 1-correlator. To simplify the discussion of these two estimators, it is assumed that the number, N, of timing candidates, is equal to the number of samples per symbol. Nevertheless, both estimators are equally applicable when this assumption is relaxed.

(b) The 2L-correlators Realization

The optimal, data-aided, one-shot timing estimation without channel information is:

$$\hat{\tau}_{non}(m) = \arg\max_{\tau \in [0,T)} \sum_{l=0}^{L-1} \left| \sum_{n=0}^{N_c-1} \sum_{q=0}^{1} r(m,n,q) \hat{s}_l^{(\tau)}(m,n,q) \right|^2 \hat{\sigma}_l^2 \quad (20)$$

$$= \arg\max_{\tau \in \{lT_c/2 | l=0,1,\cdots,2N_c-1\}} \sum_{l=0}^{L-1} \left| \sum_{n=0}^{N_c-1} \sum_{q=0}^{1} r_{LP}\left(mT + nT_c + q\frac{T_c}{2}\right) \hat{s}_l^{(\tau)}(m,n,q) \right|^2 \hat{\sigma}_l^2$$

$$\cong \arg\max_{\tau \in \{lT_c/2 | l=0,1,\cdots,2N_c-1\}} \sum_{l=0}^{L-1} \left| \sum_{n=0}^{N_c-1} \sum_{q=0}^{1} r_{LP}\left(mT + nT_c + q\frac{T_c}{2} + \tau\right) \hat{s}_l^{(0)}(m,n,q) \right|^2 \hat{\sigma}_l^2.$$

Therefore, the $2N_c$ timing candidates share the same filter bank with the 2L-correlators. When the received information bits are unknown to the estimator, the timing estimator becomes $$\hat{\tau}_{2L}(m) = \arg\max_{\substack{\tau \in \\ \{lT_c/2 | l=0,1,\cdots,2N_c-1\} \\ (b(m),b(m-1)) \in \\ \{(-1,-1),(-1,1)\}}} \sum_{l=0}^{L-1} \left| \sum_{n=0}^{N_c-1} \sum_{q=0}^{1} r_{LP}\left(mT + nT_c + q\frac{T_c}{2} + \tau\right) \hat{s}_l^{(0)}(m,n,q) \right|^2 \hat{\sigma}_l^2 \quad (21)$$

Figure 11:
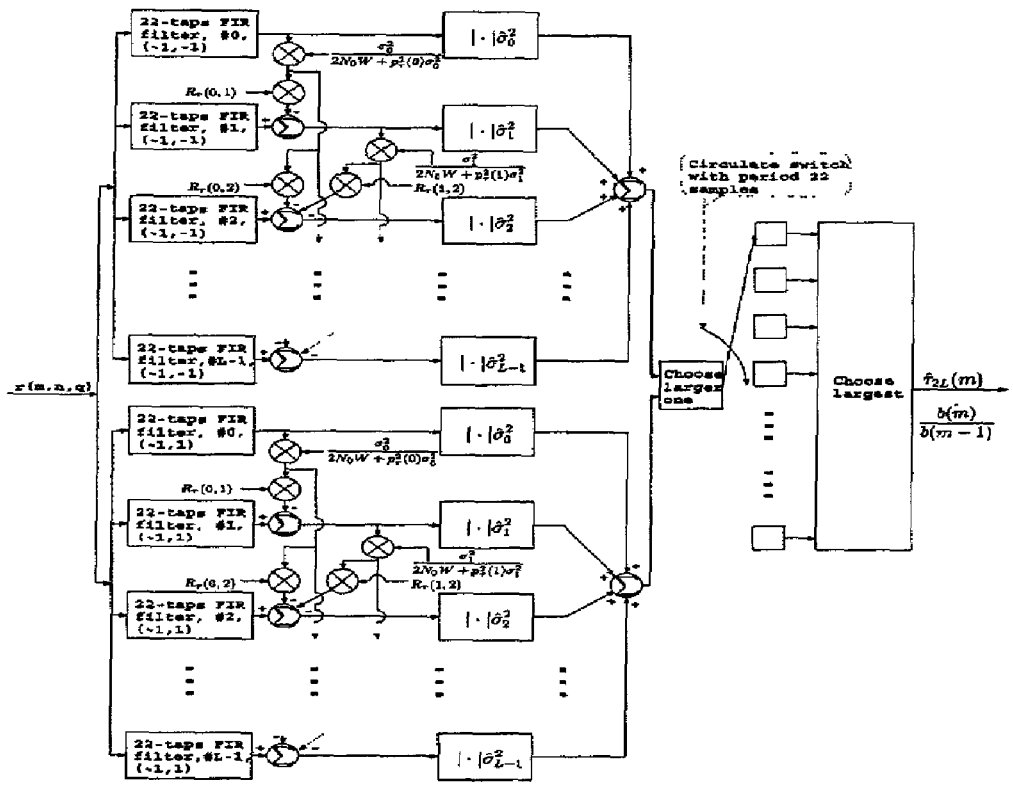
FIG. 11 is a block diagram of a sub-optimal timing estimator with 2L, 22-taps, finite impulse response (FIR) filters.
Figure 11:
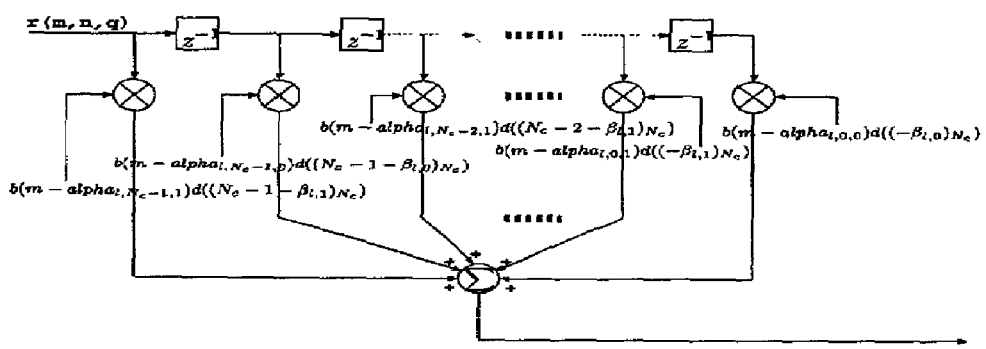

FIG. 11 is a block diagram of a sub-optimal timing estimator with 2L, 22-taps, finite impulse response (FIR) filters. It is remarkable that these FIR filters do not contain multiplication operations when the employed signature sequence is binary-valued, such as, for example, the Barker sequence in IEEE 802.11b.

(c) The 1-Correlator Realization

A further simplified estimator can be obtained by approximating $\hat{\tau}_{2L}(m)$ as:

$$\hat{\tau}_{2L}(m) \simeq \arg\max_{\tau \in \{iT_c/2 | i=0,1,\cdots,2N_c-1\}} \sum_{l=0}^{L-1} \left| \sum_{n=0}^{N_c-1} \sum_{q=0}^{1} r_{LP}\left(mT + nT_c + q\frac{T_c}{2} + \tau + l\frac{T_c}{2}\right) d(n) \right|^2 \hat{\sigma}_l^2 \quad (22)$$

$$\simeq \arg\max_{\tau \in \{iT_c/2 | i=0,1,\cdots,2N_c-1\}} \sum_{l=0}^{L-1} \left| \sum_{n=0}^{N_c-1} \sum_{q=0}^{1} r_{LP}\left(mT + nT_c + q\frac{T_c}{2} + \tau + l\frac{T_c}{2}\right) d(n) \right|^2 \gamma_l$$

$$\equiv \hat{\tau}_{sub}(m),$$

where the $\gamma_l$ for $l=0, 1, \ldots, L-1$, are some constants that are assigned when $$\frac{\hat{\sigma}_l^2}{2N_0W} \equiv \frac{\frac{\sigma_l^2}{2N_0W}}{1 + \hat{p}_\tau^2(l)\frac{\sigma_l^2}{2N_0W}} = \frac{SNR_l}{1 + \hat{p}_\tau^2(l)SNR_l},$$

and which depend on the signal to noise ratio in each multi-path, and are not known beforehand. In fact, these parameters do not degrade the performance much at all. Therefore the reference parameters determined experimentally through the simulations discussed below, can be used.

Figure 12:
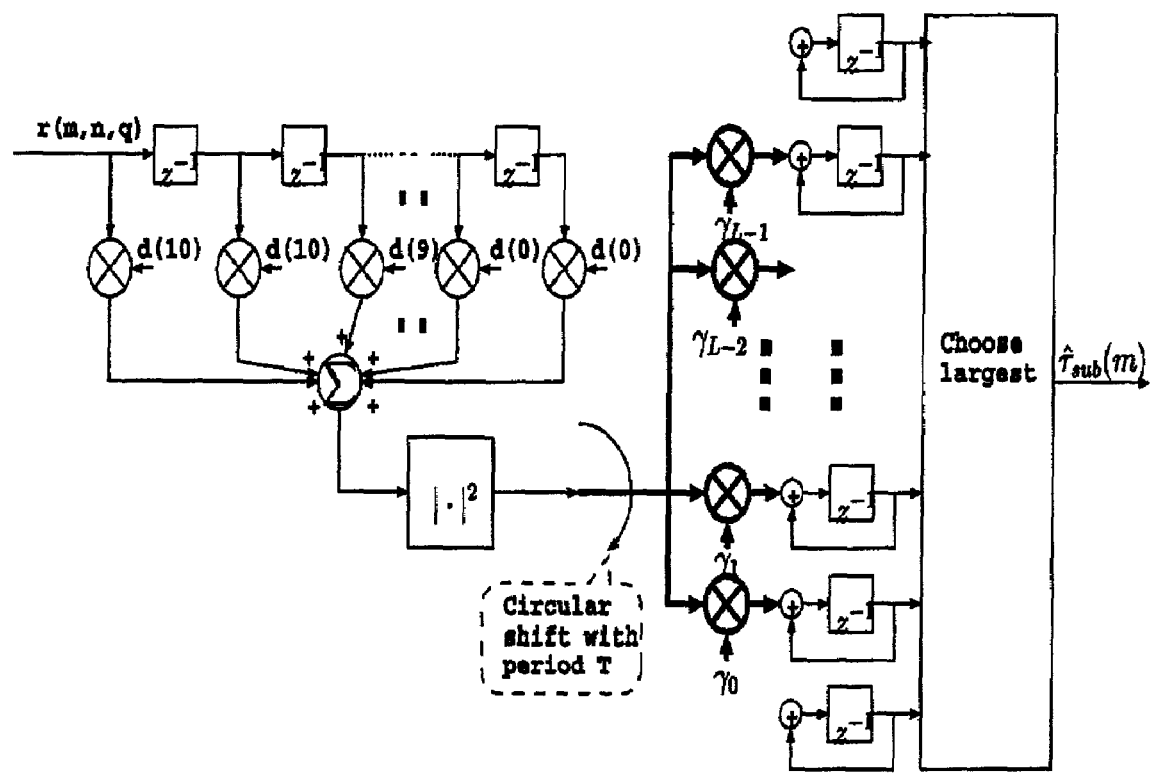
FIG. 12 is a block diagram of a sub-optimal, one-shot timing estimator, without channel information, but with a $$\text{1-correlator, and } \gamma_l = \frac{\sigma_l^2}{2N_oW + \hat{p}_\tau^2(l)\sigma_l^2};$$

FIG. 12 is a block diagram of a sub-optimal, one-shot timing estimator, without channel information, but with a 1-correlator, and $$\gamma_l = \frac{\sigma_l^2}{2N_0W + \hat{p}_\tau^2(l)\sigma_l^2}.$$

This timing estimator only needs a 22-taps, multiplication-free, FIR filter.

(d) Simulations

The inventors conducted simulations to test the effectiveness of these sub-optimal timing estimators. The received information bits were assumed to be binary-valued, but unknown to the estimators. In addition, the information bits were spread by a Barker sequence of length 11, and were transmitted over the frequency-selective, slowly fading channels with models suggested in IEEE 802.11b. However, this channel information was unknown to the estimator.

The received signal was sampled twice per chip and the number of timing candidates was $2N_c=22$. The received pulse, $p_{rx}(t)$, was a raised cosine function with a roll-off factor of 1.

Figure 13:
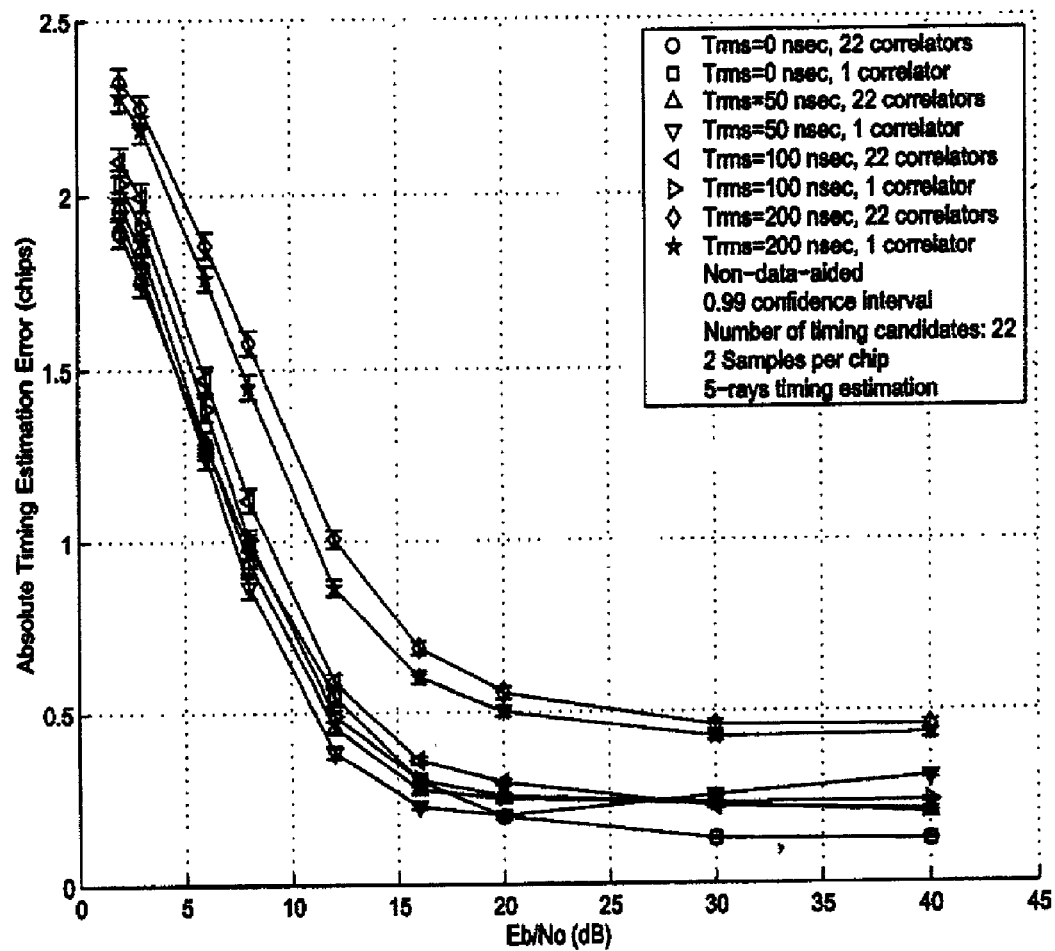
FIG. 13 is a graph that shows simulation results comparing 2L-correlator and 1-correlator estimators.

The graph in FIG. 13 demonstrates the effectiveness of the disclosed 2L-correlators and 1-correlator timing estimators. It is particularly significant that the estimation errors of both one-shot estimators are less than 0.5 chips when the signal-to-noise ratio (SNR) is larger than 20 dB.

Moreover, both estimators are robust with respect to any frequency offset impairment caused by the Doppler effect, fading channel effects, and imperfect oscillators. The simulations support the conclusion that this robustness of the estimators is inherited from the timing estimation with unknown carrier phases.

Figure 14:
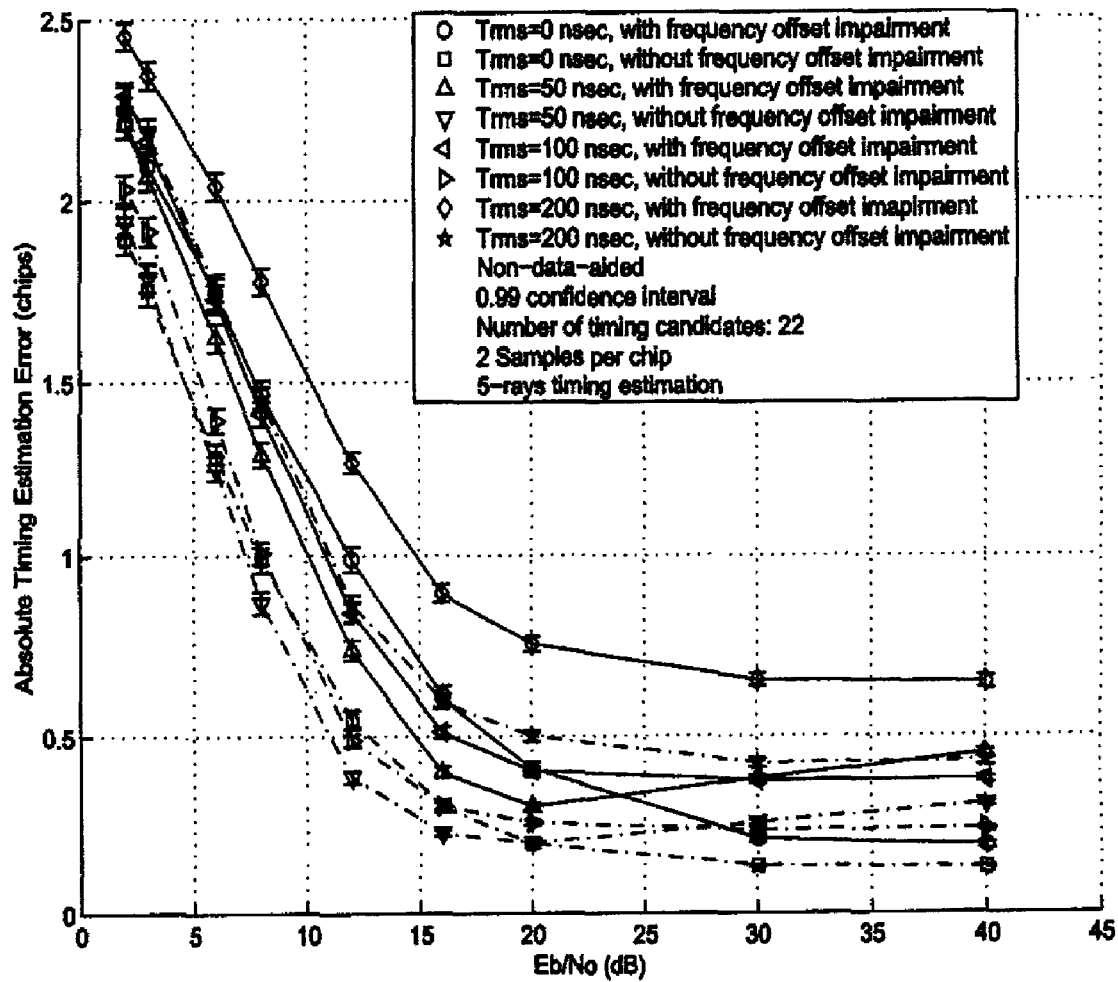
FIG. 14 is a graph of simulation results that show the impact of frequency offset impairment on 1-correlator timing estimation with 5-rays receiving.
Figure 15:
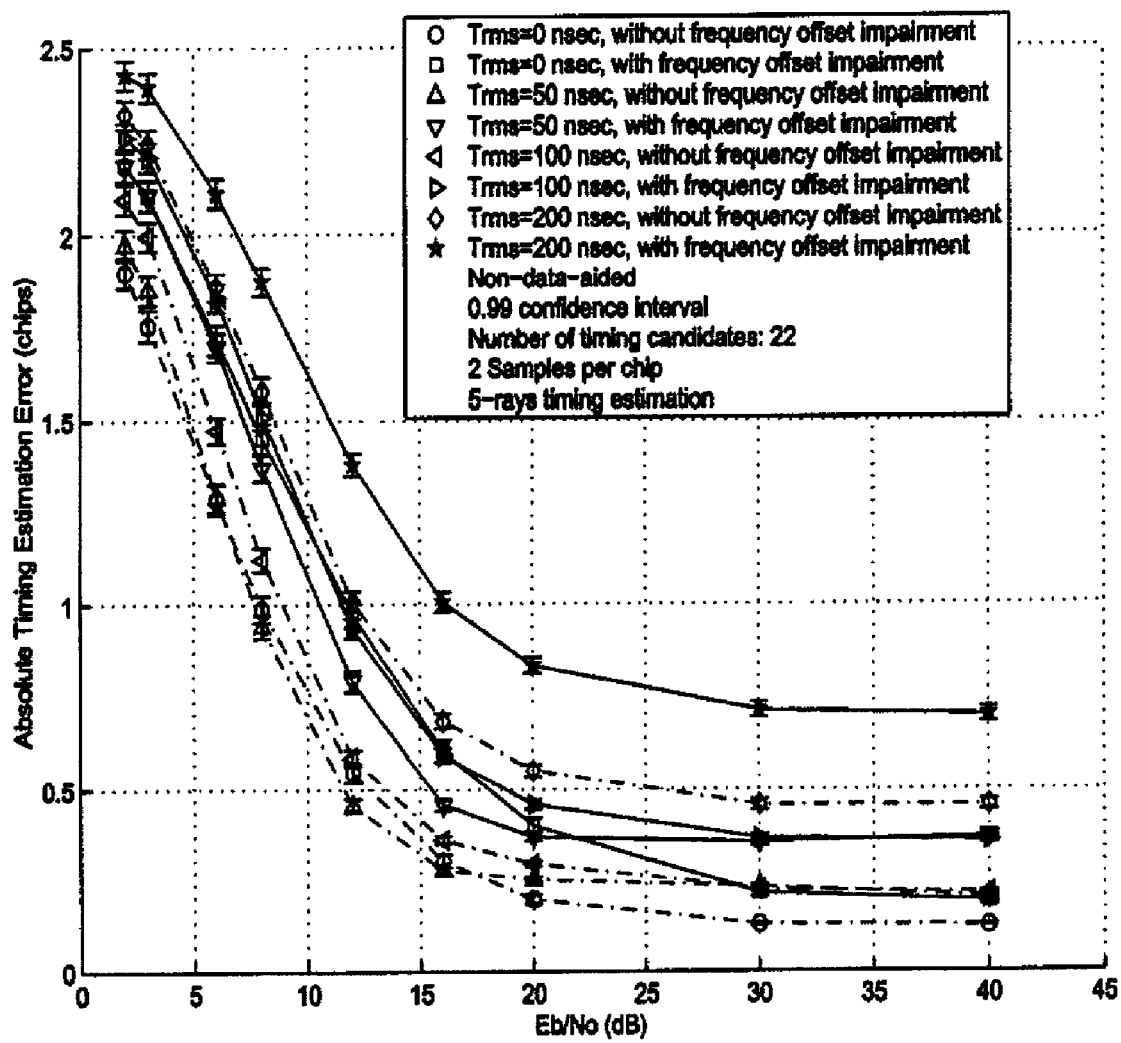
FIG. 15 is a graph of simulation results that show the impact of frequency offset impairment on 2L-correlator timing estimation with 5-rays receiving.

The graphs in FIG. 14 and FIG. 15 demonstrate the robustness of these estimators to a carrier phase rotation of Π/8 per symbol.

4. CONCLUSIONS

Although frequency diversity and multi-path interference are both caused by the frequency-selective channel, they affect wireless communications systems in different ways. For on the one hand, by using the frequency diversity induced by frequency-selective channels, not only can channel fading impairment be fixed, multi-path interference can also be mitigated. On the other hand, by ignoring the interference caused by multi-paths, the system suffers both channel fading impairment and performance degradation due to interference.

This principle applies not only in the detection of frequency-selective, fading channels, but also in timing estimation, as has been established in this disclosure.

This disclosure began with a derivation of the optimal timing estimation based on the application of the MAP criterion to frequency-selective, slowly fading channels with known channel information and known received information bits. This result was later generalized to the optimal timing estimation with unknown channel information, first with known and then with unknown received information bits.

Next, the effective, sub-optimal, timing estimator with only a 22-taps, multiplication-free, FIR filter was disclosed. The extremely practical nature of this sub-optimal estimator was demonstrated through simulations. Moreover, this timing estimator was shown to be robust with respect to frequency offset impairment.

When estimating the received time without channel information, instead of trying to perfectly match the received signal with the locally generated signal, the optimal estimation actually collects the received energy on the multi-paths. Therefore, the natural limitation of timing estimation to multi-path channels with long delay spreads dominates the performance when the channel information is unknown beforehand.

This leads to the following strategy for synchronization over frequency-selective, fading channels. For a multi-path channel with a short delay spread, first estimate the received timing without channel information, and then estimate the received carrier phases and amplitudes on the multi-paths based on this timing estimate. On the other hand, for a channel with a long delay spread, the first step should be to estimate the received carrier phases and amplitudes of the multi-paths.

It is particularly significant that the assumption of a time-invariant channel over M symbols can easily be relaxed. Because of the nature of one-shot estimation, this assumption relaxation is equally applicable to the one-shot setting as long as the channel is time-invariant within a symbol duration. In addition, the timing estimate for M symbols can also be derived by simply accumulating the decision statistics on the one-shot estimation.

Finally, these proposed timing estimators are not limited to DSSS communications systems. They can be applied to the more general setting of generalized signature sequences.

It should be understood that the foregoing relates only to certain embodiments of the present invention, and that numerous changes and modifications may be made without departing from the spirit and scope of the invention as defined in the following claims.

The invention claimed is:

1. A method for estimating a received time of a received signal, comprising:
   receiving the received signal carrying a plurality of information bits, transmitted by a transmitter through a frequency-selective channel comprising a plurality of multi-paths; and
   determining the received time by a composite hypothesis test comprising the following steps:
      providing a plurality of timing candidates;
      computing a plurality of likelihoods respectively corresponding to the timing candidates based on the received signal and a function derived by averaging a likelihood function having a plurality of unknown parameters, and the unknown parameters comprise amplitude and carrier phase of at least one multi-path; and
      choosing a timing candidate having the maximal likelihood to be the received time.

2. The method of claim 1, wherein:
   the composite hypothesis test employs a maximum posteriori probability (MAP) criterion; and
   the likelihood function is averaged over the unknown parameters to examine the likelihoods of the timing candidates.

3. The method of claim 2, wherein the received signal is transmitted by a direct sequence, spread spectrum communications system.

4. The method of claim 2, wherein the amplitudes and carrier phase of each multi-path channel are unknown to the receiver.

5. The method of claim 2, wherein the unknown parameters further comprise the plurality of information bits carried within the transmitted signal.

6. The method of claim 2, wherein the received signal is a continuous time signal.

7. The method of claim 2, wherein the received signal is a discrete time signal.

8. The method of claim 2, wherein the step of computing the likelihoods includes using k-taps finite impulse response filters.

9. The method of claim 8, wherein k equals 22 when a Barker sequence of length 11 is used.

10. The method of claim 2 further comprising using a plurality of correlators to estimate the received time.

11. The method of claim 2, wherein the step of computing the likelihoods employs a k-taps multiplication-free finite impulse response filter.

12. The method of claim 11 wherein k equals 22 when a Barker sequence of length 11 is used.

13. The method of claim 2, wherein the step of computing the likelihoods includes using a 1-correlator.

14. The method of claim 2, wherein the step of computing the likelihoods comprises:
   correlating the received signal with at least one locally generated signal to form a correlated output signal, wherein the locally generated signal relates to at least one timing candidate and at least one multi-path component;
   generating a plurality of real-valued outputs from the correlated outputs, based on the energy of the correlated outputs;
   linearly combining the real-valued outputs to form a plurality of linear combination outputs, so that each of the linear combination outputs corresponds to one of the timing candidates;
   determining a linear combination output having a maximal value; and
   choosing the timing candidate corresponding to the maximal linear combination output, so that the energy of the correlated outputs is maximized.

15. The method of claim 14, wherein the step of correlating comprises canceling the contribution of the correlation caused by the multi-path components for each timing candidate.

16. The method of claim 14, wherein the step of correlating comprises:
   generating a plurality of delayed received signals; and
   correlating the plurality of delayed received signals with the plurality of locally generated signals.

17. The method of claim 14, wherein the energy is the square sum of the signal magnitude within a symbol.

18. The method of claim 17, wherein the step of correlating step comprises canceling the contribution of the correlation caused by the multi-path components for each timing candidate.

19. The method of claim 17, wherein the step of correlating comprises:
   generating a plurality of delayed received signals; and
   correlating the plurality of delayed received signals with the plurality of locally generated signals.

20. The method of claim 14, the energy is the sum of the signal magnitude within a symbol.

21. The method of claim 20, wherein the step of correlating comprises canceling the contribution of the correlation caused by the multi-path components for each timing candidate.

22. The method of claim 20, wherein the step of correlating comprises:
   generating a plurality of delayed received signals; and
   correlating the plurality of delayed received signals with the plurality of locally generated signals.

23. The method of claim 2, wherein the channel has a long delay spread, and wherein the step of computing the likelihoods comprises:
   estimating the received carrier phases and amplitudes of the multi-paths;
   correlating the received signal with at least one locally generated signal to form a correlated output signal, wherein the locally generated signal relates to at least one timing candidate and at least one multi-path component;
   generating a plurality of real-valued outputs from the correlated outputs based on the energy of the correlated outputs;
   linearly combining the real-valued outputs to form a plurality of linear combination outputs, so that each of the linear combination outputs corresponds to one of the timing candidates;
   determining a linear combination output having a maximal value; and choosing the timing candidate corresponding to the maximal linear combination output, so that the energy of the correlated outputs is maximized.

24. The method of claim 23, wherein the energy is the real part of the correlated output.

25. The method of claim 23, wherein the step of correlating comprises canceling the contribution of the correlation caused by the multi-path components for each timing candidate.

26. The method of claim 23, wherein the step of correlating comprises:
generating a plurality of delayed received signals; and
correlating the plurality of delayed received signals with the plurality of locally generated signals.

27. The method of claim 2, wherein the channel has a short delay spread, and wherein the step of computing the likelihoods comprises:
correlating the received signal with at least one locally generated signal to form a correlated output signal, wherein the locally generated signal relates to at least one timing candidate and at least one multi-path component;
generating a plurality of real-valued outputs from the correlated outputs based on the energy of the correlated outputs;
linearly combining the real-valued outputs to form a plurality of linear combination outputs, so that each of the linear combination outputs corresponds to one of the timing candidates;
determining a linear combination output having a maximal value; choosing the timing candidate corresponding to the maximal linear combination output, so that the energy of the correlated outputs is maximized; and
estimating the received carrier phases and amplitudes of the multi-paths.

28. The method of claim 27, wherein the energy is the square sum of the signal magnitude within a symbol.

29. The method of claim 27, wherein the energy is the sum of the signal magnitude within a symbol.

30. The method of claim 27, wherein the step of correlating comprises canceling the contribution of the correlation caused by the multi-path components for each timing candidate.

31. The method of claim 27, wherein the step of correlating comprises:
generating a plurality of delayed received signals; and
correlating the plurality of delayed received signals with the plurality of locally generated signals.

32. The method of claim 1, wherein the received signal is transmitted by a direct sequence, spread spectrum communications system.

33. The method of claim 1, wherein the amplitude and carrier phase of each multi-path are unknown to the receiver.

34. The method of claim 1, wherein the unknown parameters further comprise a plurality of information bits carried with the transmitted signal.

35. The method of claim 1, wherein the received signal is a continuous time signal.

36. The method of claim 1, wherein the received signal is a discrete time signal.

37. The method of claim 1, wherein the step of computing the likelihoods employs a k-taps finite impulse response filter.

38. The method of claim 37 wherein k equals 22 when a Barker sequence of length 11 is used.

39. The method of claim 1 further comprising using a plurality of correlators to estimate the received time.

40. The method of claim 1, wherein the step of computing the likelihoods employs a k-taps multiplication-free finite impulse response filter.

41. The method of claim 40 wherein k equals 22 when a Barker sequence of length 11 is used.

42. The method of claim 1, wherein the step of computing the likelihoods includes using a 1-correlator.

43. An apparatus for estimating a received time of a received signal transmitted by a transmitter through a frequency-selective channel, comprising:
a plurality of finite impulse response filters each-correlating the received signal with a locally generated signal to form a correlated output signal, wherein the locally generated signal is formed from a plurality of timing candidates and at least one of the multi-path components;
a linear combination block coupled to the finite impulse response filters, linear combining the correlated output signals to form a plurality of likelihoods each corresponding to a timing candidate, wherein the linear combination block employs a function derived by averaging a likelihood function having a plurality of unknown parameters, and the unknown parameters comprise amplitude and carrier phase of at least one multi-path;
a set of storage components storing the likelihoods; and
a selector coupled to the storage components, selecting a maximum likelihood therefrom and outputting the corresponding timing candidate to be the received time.

44. The apparatus of claim 43, wherein the linear combination block further comprises a means for canceling a plurality of correlation contributions from a plurality of multi-path components.

45. The apparatus of claim 43, wherein the linear combination block further comprises a means for calculating the energy of the correlated output signal.

* * * * *